(12) United States Patent
Koenigs

(10) Patent No.: US 9,311,918 B2
(45) Date of Patent: Apr. 12, 2016

(54) AUTOMATED COMMUNICATION TECHNIQUES

(71) Applicant: The Pulse Network Inc., Norwood, MA (US)

(72) Inventor: Michael A. Koenigs, San Diego, CA (US)

(73) Assignee: The Pulse Network Inc., Norwood, MA (US)

( * ) Notice: Subject to any disclaimer, the term of this patent is extended or adjusted under 35 U.S.C. 154(b) by 0 days.

(21) Appl. No.: 14/220,368

(22) Filed: Mar. 20, 2014

(65) Prior Publication Data

US 2014/0207455 A1  Jul. 24, 2014

Related U.S. Application Data

(62) Division of application No. 12/703,171, filed on Feb. 9, 2010, now Pat. No. 8,787,538.

(60) Provisional application No. 61/151,232, filed on Feb. 10, 2009.

(51) Int. Cl.
| | |
|---|---|
| *H04M 1/64* | (2006.01) |
| *G10L 15/26* | (2006.01) |
| *G06Q 10/10* | (2012.01) |
| *G06Q 30/02* | (2012.01) |
| *H04L 12/58* | (2006.01) |
| *H04M 3/533* | (2006.01) |
| *H04L 12/18* | (2006.01) |

(52) U.S. Cl.
CPC ............ *G10L 15/265* (2013.01); *G06Q 10/107* (2013.01); *G06Q 30/02* (2013.01); *G10L 15/26* (2013.01); *H04L 12/5835* (2013.01); *H04L 51/066* (2013.01); *H04M 3/53375* (2013.01); *H04L 12/185* (2013.01)

(58) Field of Classification Search
CPC combination set(s) only.
See application file for complete search history.

(56) References Cited

U.S. PATENT DOCUMENTS

| | | | |
|---|---|---|---|
| 6,262,724 B1 | 7/2001 | Crow et al. | |
| 7,774,799 B1 | 8/2010 | Sellers et al. | |
| 8,595,016 B2 * | 11/2013 | Van Sciver et al. | 704/275 |

(Continued)

OTHER PUBLICATIONS

"Email Marketing Features"—http://www.interspire.com/emailmarketer/features.php, pp. 1-9, accessed Feb 9, 2010.
"Features and Pricing"—http://www.1shoppingcart.com/features-pricing/, pp. 1-2, accessed Feb 9, 2010.
"Features"—http://www.aweber.com/email-marketing-features.htm, pp. 1-6, accessed Feb 9, 2010.

(Continued)

*Primary Examiner* — Joseph T Phan
(74) *Attorney, Agent, or Firm* — Nutter McClennen & Fish LLP

(57) ABSTRACT

Various technologies and techniques are disclosed for providing an autoresponder that allows subscribers to opt-in to one or more autoresponder campaigns using their spoken voice. Voice input is received from a subscriber and converted to text. The subscriber is added to at least one campaign. A contact communication identifier is stored in a subscriber contact record from the text that was converted from the voice input. One or more messages are sent to the subscriber using the contact communication identifier, and according to a schedule specified in the campaign. A virtual seminar playback system is described that simulates a live virtual seminar and allows subscribers to access a playback of a media recording over a communication connection at a specified time. An autoresponder system is described that delivers messages to subscribers in multiple available formats, based upon selections received by the subscribers.

6 Claims, 32 Drawing Sheets

(56) References Cited

U.S. PATENT DOCUMENTS

| | | |
|---|---|---|
| 8,787,538 B2 | 7/2014 | Koenigs |
| 2002/0120697 A1 | 8/2002 | Generous et al. |
| 2002/0161804 A1 | 10/2002 | Chiu et al. |
| 2005/0064852 A1 | 3/2005 | Baldursson |
| 2009/0299957 A1* | 12/2009 | Ledlie .............................. 707/2 |
| 2010/0010873 A1 | 1/2010 | Moreau |
| 2010/0202597 A1 | 8/2010 | Koenigs |
| 2013/0024267 A1 | 1/2013 | Libenson et al. |
| 2013/0036162 A1 | 2/2013 | Koenigs |

OTHER PUBLICATIONS

"Interactive SMS Solutions"—http://www.unwiredappeal.com/interactive.html, pp. 1-2, Feb 9, 2010.

"Small business marketing just grew up"—http://www.infusionsoft.com/features, pp. 1-2, accessed Feb 9, 2010.

"SMS Autoresponders"—http://www.fabit.com/products/mobile/sms/inbound-sms/sms-autoresponders.aspx, pp. 1-2, accessed Feb 9, 2010.

"What Can iContact Do?"—http://www.icontact.com/features, pp. 1-6, accessed Feb 9, 2010.

* cited by examiner

150

Add New Campaign

Campaign Name: [_____] —152
Your Name: [_____]
Your Email: [_____]

Your Incoming Phone #:
[ 1-866-123-4567 (Requires Pin) ▼ ] —154
Click here to add your own toll-free number or local number

Your Outbound Caller ID #: [_____▼] —156
Campaign Status: [Active ▼]

158
Transfer to live operator ☑           —160
Transfer calls to operator automatically: ☑ If checked, transfer will happen automatically at the very beginning of the call. If unchecked, callers must press 1 to transfer.
Phone number to transfer to: [_____] —162

Email Voicemail Transcripts —164   166         168
Email Address 1:              ☐ Attach Audio File
[_____]

Email Address 2:              ☐ Attach Audio File
[_____]

Email Address 3:              ☐ Attach Audio File
[_____]

Note: The system will preceed the subject line with "[Bad Email]" if no email address is detected, or if there is an invalid email address.

Email address to receive SMS replies:
⎯172

Custom Fields:  ⎯174                                  175⎯
Field Name 1: [                    ]   Enable KDA: ☐
Field Name 2: [                    ]   Enable KDA: ☐
Field Name 3: [                    ]   Enable KDA: ☐
Field Name 4: [                    ]   Enable KDA: ☐
Field Name 5: [                    ]   Enable KDA: ☐
KDA stands for Keyword Density Analysis

If recipient leaves voicemail, subscribe them to another campaign:
Campaign to add recipient to: [       ▼]⎯176

When recipient joins campaign, remove them from the following campaign:
Campaign to remove recipient from: [       ▼]⎯177

If call recipient speaks their email address when leaving a voicemail, subscribe them to autoresponder:
Autoresponder email address: [              ]⎯178

Add New SMS Message

Campaign Name: Sample campaign 3

Send Message [    ] [Minutes ▼] after subscribed — 302

Message: 160 Characters Remaining (160 Max)

[                                                    ] — 304

Custom Tags: {email} {firstname} {lastname} {address} {address_2} {city} {state} {zip} {country} {phone} {metro} {phone type} {country_code} {area_code} {timezone} {custom_1} {Business Type}

Note: If the system knows that a phone number is a landline, it will not send an SMS message to it.

Allow replies to SMS: ☑ — 306

Note: Replies will be forwarded to your "SMS Reply" email address listed for each campaign.

Forward Reply or Populate Subscriber Field with Reply:
[Website URL ▼] — 308
Resend message [Never ▼] later if no reply is received
— 310
This conversation expects numeric replies: ☐ — 312

After Receiving Reply, Send Immediate Follow-up Messages: ☐ — 314

Do Not Broadcast To Existing Subscribers. Only add to the message sequence. ☐ — 316

Add New SMS Broadcast

Message: 160 Characters Remaining (160 Max)

[                                        ] ─391

Custom Tags: {email} {firstname} {lastname} {address} {address_2} {city} {state} {zip} {country} {phone} {metro} {phone type} {country_code} {area_code} {timezone}

Note: If the system knows that a phone number is a landline, it will not send an SMS message to it.

Allow replies to SMS: ☑ ─392

Note: Replies will be forwarded to your "SMS Reply" email address listed for each campaign.

Forward Reply or Populate Subscriber Field with Reply:
[Please select the field ▼]
Resend message [Never ▼] later if no reply is received

394

This conversation expects numeric replies: ☐
After Receiving Reply, Send Immediate Follow-up Messages: ☐
Do Not Broadcast To Existing Subscribers. Only add to the message sequence. ☐

Broadcast Audience: ─ 396
   ☑ Subscriber List A
   ☐ Subscriber List B
Execute Date: [February ▼][05 ▼][2009 ▼] ─ 397
Execute Time: [11 ▼][40 ▼][AM ▼] ─ 398
Note: Leave these as the defaults to broadcast immediately.

[ SAVE ] ─399

Add New Campaign

Campaign Name: [Los Angeles Plumber Buddy]
Your Name: [ ]
Your Email: [ ]

Your Incoming Phone #:
[1-810-123-4567 (Requires Pin) ▼] ─432
Click here to add your own toll-free number or local number

Your Outbound Caller ID #: [ ▼]
Campaign Status: [Active ▼]

Transfer to live operator ☑ ─434          ,436
Transfer calls to operator automatically: ☑ If checked, transfer will happen automatically at the very beginning of the call. If unchecked, callers must press 1 to transfer.
Phone number to transfer to: [1-317-123-4567] ─438

Email Voicemail Transcripts
  Email Address 1:            ☐ Attach Audio File
  [ ]

Email Address 2:            ☐ Attach Audio File
  [ ]

Email Address 3:            ☐ Attach Audio File
  [ ]

Note: The system will preceed the subject line with "[Bad Email]" if no email address is detected, or if there is an invalid email address.

Audio File For Incoming Calls:
Current File: Mike Incoming Message <u>Listen</u> —— 542
[Mike Incoming Message ▼] —— 544
Note: If this is a teleseminar, this is the message that will be played if someone calls before or after the lines are open.

Virtual Seminar Options:
[This is a teleseminar that will happen one time ▼] —— 546

Virtual Seminar Date: [ ] —— 548
Time: [7:00pm ▼] CST, Central US — 550
552 — Duration: [5 mins ▼] (The duration of your audio file)
554 — Open Seminar Channel/Line: [5 mins ▼] before event starts

Join participants to the following campaigns upon end of virtual seminar:
If Absent:        [Next Teleseminar ▼] —— 556
If Arrived Late:  [Teleseminar Replay ▼] —— 558
If Left Early:    [Teleseminar Replay ▼] —— 560
If Completed:     [None ▼] —— 562

Pre-Seminar Media File
Current File: [Intro by Mike ▼]   <u>Listen/Watch</u>
                                   564 / 566

Virtual Seminar Media File
Current File: [Click to select or upload new ▼]  <u>Listen/Watch</u>
                                                  568 / 570

[ SAVE ] —— 572

FIG. 20

Current Campaign: Test

Subscribers Action
- Edit Details
- Search Subscribers — 734
- Add New
- Import Subscribers

| First Name | Last Name | Address | City | State | Zip | Phone | Fax | Email | Contact Methods |
|---|---|---|---|---|---|---|---|---|---|
| Jane | Doe | | | | | 317-555-1212 | | john@somewhere.com | Voice Broadcast / SMS Message / Email / Voice Broadcast by Email / Fax |
| John | Doe | | | | | | | jane@somewhere.com | Voice Broadcast / SMS Message / Email / Voice Broadcast by Email / Fax |

Tabs: Home | Messages | Subscriber | Campaign Settings | Tracking/Reports

FIG. 26

AUTOMATED COMMUNICATION TECHNIQUES

CROSS-REFERENCE TO RELATED APPLICATION

This application is a divisional of U.S. application Ser. No. 12/703,171, filed Feb. 9, 2010, and claims the benefit of U.S. Provisional Application No. 61/151,232, filed Feb. 10, 2009, which applications are incorporated by reference herein in their entirety.

BACKGROUND

In today's world of technology, companies can broadcast messages to volumes of subscribers in an automated way, yet in a way that is personalized. For example, many companies use an autoresponder series to allow subscribers to opt-in to a message sequence to receive free training and/or product offers that are being made by the company or its affiliates. If a company had to manually type up an email to send it to each subscriber, it would be time prohibitive. Autoresponders were created to automate this process of follow-up with subscribers by email.

To setup an autoresponder, an administrator simply creates one or more messages that need to be sent to people who subscribe to it, and specify the schedule for when those messages should be sent. The autoresponder is then associated with one or more subscriber lists, so that when a customer or prospect opts-in to a particular subscriber list, they receive the messages that were specified in the autoresponder series.

As technology has continued to advance, people have also continued to evolve in the way in which they work and play. Many people use their mobile phone or other mobile device for checking email and/or surfing the internet. Some people like talking on the phone more than using email, while others love SMS text messages. There is another segment that still likes to use faxes too. Existing autoresponder systems rely on email as the primary method of communication, without taking these changing user preferences into consideration.

SUMMARY

Various technologies and techniques are disclosed for providing an autoresponder that allows subscribers to opt-in to one or more autoresponder campaigns using their spoken voice. Voice input is received from a subscriber. The voice input is converted to text. The subscriber is added to at least one campaign. At least one contact communication identifier (email, phone, etc.) is stored in a subscriber contact record. At least one contact communication identifier is obtained from the text that was converted from the voice input. One or more messages are sent to the subscriber using the contact communication identifier, and according to a schedule specified in the campaign(s).

In another implementation, a virtual seminar playback system and techniques are described. A virtual seminar playback module is operable to allow subscribers to access a playback of a media recording over a communication connection, with the playback being scheduled to begin at a specific start time and last for a specific duration. The virtual seminar playback module is further operable to ensure that when a particular one of the subscribers accesses the playback at a point in time that is after the specific start time, but before the playback has passed the specific duration, the media recording is delivered to the particular one of the subscribers starting at a point in the media recording that corresponds to a delay interval. In one implementation, a virtual seminar follow-up module is operable to send follow-up messages to subscribers based upon the actions they took during the virtual seminar.

In yet another implementation, techniques and systems are described for providing autoresponder campaigns in multiple formats. The autoresponder is operable to store message(s) that are part of an autoresponder campaign in multiple available formats, such as the same message being stored in formats suitable for sending by email, voice broadcast, voice broadcast by email, text message, and/or fax, to name a few non-limiting examples. A request is received to subscribe to one or more autoresponder campaigns. The request is received from a device that has been operated by a subscriber, and the request specifies one or more formats in which the subscriber wishes to be notified. The specified format(s) was selected by the subscriber from the multiple available formats. The subscriber is added to the autoresponder campaign. The message(s) for the autoresponder campaign is sent to the subscriber in the formats that were selected by the subscriber. In another implementation, some of the available formats that are offered to subscribers are generated programmatically from one of the other formats that was created or uploaded by a user. As one non-limiting example, an email format can be converted into a voice broadcast using text-to-speech translation.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6A-6C are simulated screens for one implementation that illustrate adding a new campaign to an autoresponder system.

FIG. 10 is a simulated screen for one implementation that illustrates adding a new SMS text message to a campaign of an autoresponder system.

FIG. 14 is a simulated screen for one implementation that illustrates adding a new SMS broadcast to an autoresponder system.

FIG. 17 is a simulated screen for one implementation that illustrates using a newly added phone number as part of a campaign in an autoresponder system.

FIG. 20 is a simulated screen for one implementation that illustrates creating a virtual seminar playback with specified options.

FIG. 26 is a simulated screen for one implementation that illustrates managing subscribers associated with a particular campaign.

DETAILED DESCRIPTION

Figure 1:
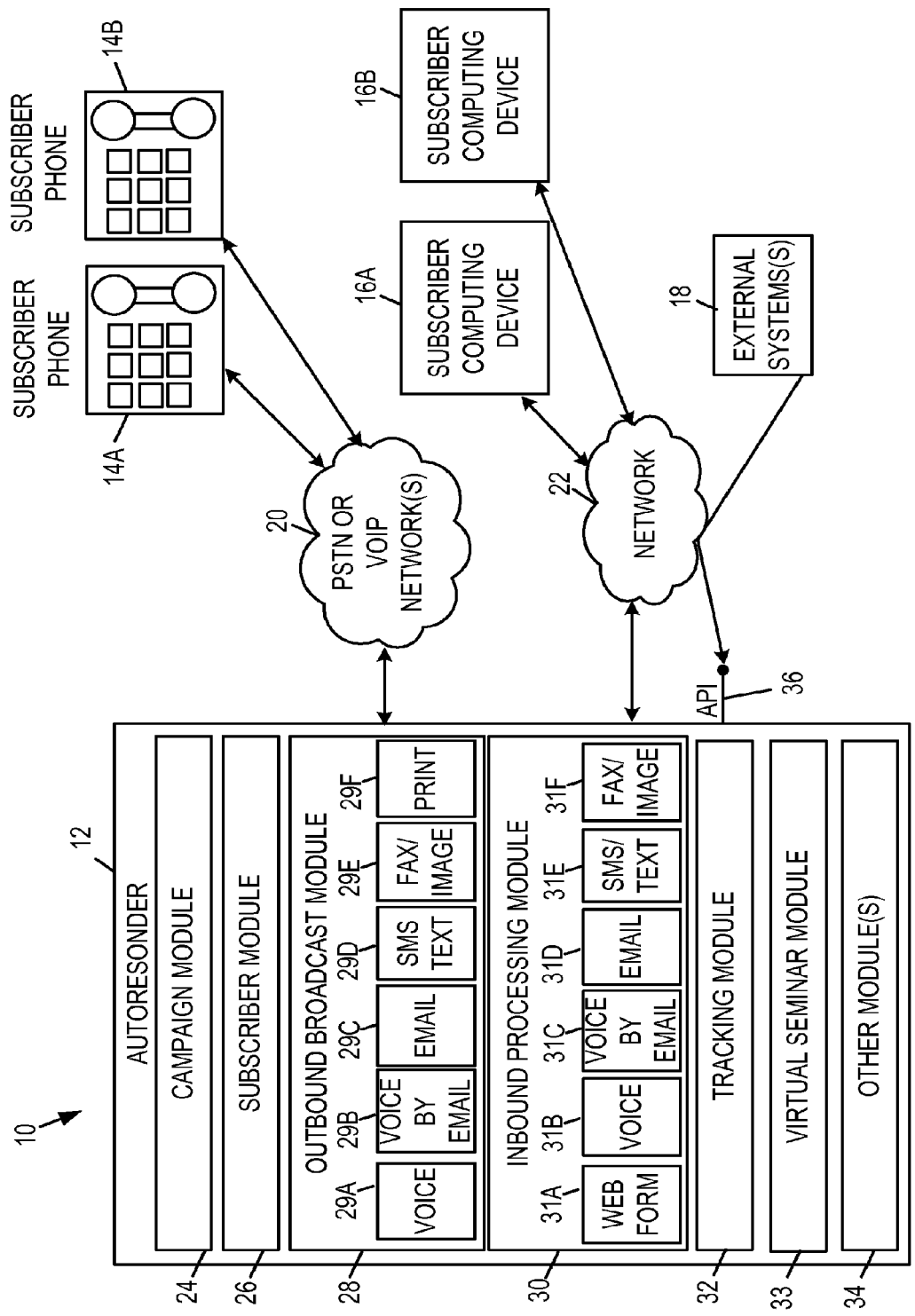
FIG. 1 is a diagrammatic view of a voice autoresponder system.

The technologies and techniques herein may be described in the general context as an autoresponder application, but the technologies and techniques also serve other purposes in addition to these. In one implementation, one or more of the techniques described herein can be implemented as features within an autoresponder program such as those offered by AWeber, 1ShoppingCart, Infusionsoft, or iContact, or from any other type of program or service that manages automated communications to subscribers. In another implementation, one or more of the techniques described herein are implemented as features within voice broadcasting and/or SMS text broadcasting applications.

In one implementation, an autoresponder is described. The term "autoresponder" as used herein is meant to include a technique for transmitting one or more messages to a group of one or more people in an automated fashion. Subscribers can sign up to receive one or more messages in an autoresponder series, such as through a voice broadcast, email, SMS text message, etc.

In the case of a voice broadcast, subscribers then receive the messages in the autoresponder series at the scheduled times through a voice broadcast that is sent to their specified telephone number. The term "voice broadcast" as used herein is meant to include an audio file or communication that is played or otherwise communicated to telephones or telephony devices that are associated with a select one or more subscribers. The voice broadcast can be played while a human is on the phone, and in some cases, when a human does not answer the phone the voice broadcast is left as a voicemail in the voicemail box that is associated with the phone.

In another implementation, an autoresponder is described that allows subscribers to receive messages in one or more of a variety of formats, based upon the individual preferences of the subscriber. Some non-limiting examples of formats in which subscribers may receive messages include voice broadcast, email, voice broadcast by email, fax, and SMS text message, to name a few.

In yet another implementation, a virtual seminar playback system is described that allows subscribers to join at the specified time, and that simulates a live virtual seminar. The term "virtual seminar" as used herein is meant to include various types of seminars that are delivered over communication connections (versus in person). A few non-limiting examples of a virtual seminar can include a teleseminar that is conducted over a telephone or other communication connection, a webinar that is delivered over an Internet connection, a webinar that is delivered over an Internet and telephone connection in combination, etc. The term "live virtual seminar" is referring to a virtual seminar that is being delivered in real time, with one or more presenters speaking or other information being delivered virtually. By simulating a live virtual seminar, subscribers are given the impression that the presenter or other information is actually being delivered at that moment, as opposed to being played back from a recording of a prior occurrence when it actually happened. In one implementation of virtual seminar playback system, follow-up messages can be sent to subscribers through an autoresponder based upon their level of participation in a particular playback that they had signed up for.

As shown in FIG. 1, an autoresponder system 10 is described. Autoresponder system 10 includes an autoresponder 12 and one or more subscriber phones 14A and 14B (referred to collectively herein as subscriber phones 14). Autoresponder 12 is coupled to subscriber phones 14 over one or more packet switched telephone networks (PSTN) and/or voice over internet protocol (VOIP) network(s) 20.

Autoresponder 12 has several modules, such as campaign module 24, subscriber module 26, outbound broadcast module 28, inbound processing module 30, tracking module 32, virtual seminar module 33, and other module(s) 34. In one implementation, one or more features provided by modules of autoresponder 12 can be accessed by one or more users having proper access levels to the associated functionality.

Campaign module 24 is responsible for managing campaigns that contain an autoresponder series of one or more messages. The messages associated with one or more campaigns can later be broadcast to subscribers of the autoresponder series on a scheduled basis by the outbound broadcast module 28, as described momentarily. Subscriber module 26 is responsible for managing one or more subscribers to one or more of the campaigns. The subscriber module 26 allows new subscribers to be added, updates to be made to data associated with existing subscribers, and existing subscribers to be deleted or unsubscribed.

Outbound broadcast module 28 is responsible for sending out message broadcasts to one or more subscribers on a scheduled basis. Outbound broadcast module can send out messages to subscribers in one or more formats, such as voice broadcast 29A, voice broadcast by email 29B, email 29C, SMS text message 29D, fax or other image 29E, and/or in a physically printed document 29F, to name a few non-limiting examples.

Any one or more of these message formats (29A-29F) can contain various types of information just as a typical text-based autoresponder message might include. For example, in the case of a voice broadcast 29A, it could include information such as free training on one or more topics, a special offer or discount to a product or service, information that the subscriber requested about a product or service, etc.

A voice broadcast 29A that gets distributed to subscribers by outbound broadcast module 28 can be captured in an audio file in one of a variety of ways. As one non-limiting example, a voice broadcast gets sent out to one or more subscribers by playing an audio file that was previously recorded over a telephone, captured in a voicemail, and then saved to an audio file. In other words, an administrator or other user with permission to manage the messages that get sent to the subscribers can dial into a specified phone number and leave a voice message. That saved voice message is then captured or otherwise converted to an audio file format. That saved voice message is then assigned as a voice broadcast for an autoresponder series of a particular campaign that is managed by campaign module 24.

As another non-limiting example, outbound broadcast module 28 can send out the one or more voice broadcasts 29A by playing an audio file that has been recorded using a recording device and uploaded to the campaign module 24. Examples of such recording devices can include a computer, video camera, tape recorder, Dictaphone, or any other device that is capable of capturing the spoken word and saving it into an audio format that can then be uploaded on a computer.

In the case of voice broadcast by email 29B, outbound broadcast module 28 can take the audio file that was captured for the voice broadcast 29A, and just email it to the subscriber at the specified email address. Alternatively or additionally, a separate audio file could be uploaded for attaching to an email. In the case of email 29C, outbound broadcast module 28 can send the message in the format of an email using traditional email technologies. And in the case of SMS text message 29D, outbound broadcast module 28 can send the message in the format of an SMS text message using currently available SMS text messaging technologies.

For fax/images 29E, outbound broadcast module 28 can transmit the fax over a telephone fax line, using a computer that is capable of transmitting faxes or image documents, or through an email service that is capable of transmitting images as faxes or attachments. In the case of printed documents 29F, outbound broadcast module 28 can send a signal to a network printed to queue the documents, can submit a specification file to a fulfillment center for processing, and/or can otherwise queue the printed documents for later processing.

Inbound processing module 30 is responsible for receiving an incoming communication from a particular one of the subscribers and taking an action based upon an action specified by the particular subscriber, such as signing up the subscriber to one or more follow-up campaigns to provide the requested information to the subscriber. For example, the subscriber can sign up for one or more campaigns and/or otherwise request information using a web form 31A on a web site, by voice 31B, by voice that is submitted as an attachment to an email 31C, by email 31D, through an SMS text message 31E, or by fax/image 31F.

Once inbound processing module 30 receives the request for information from the subscriber, the subscriber is then provided with the information that is requested. In some cases, this will involve adding the subscriber to one or more campaigns that then follow-up with the requested information in the one or more formats that the subscriber requested to receive that information in (such as email and voice broadcast, etc.)

In one implementation, the input that can be received by inbound processing module 30 is not just limited to signing up a subscriber to one or more campaigns. As one non-limiting example, while playing a voice broadcast message, when a particular subscriber presses one or more keys on a telephone device that have been associated with an unsubscribe command, then inbound processing module 30 can receive the command and unsubscribe the particular subscriber from one or more campaigns.

As another non-limiting example, while playing a voice broadcast message, when the particular subscriber presses one or more keys on a telephone device that have been associated with a live operator command, the inbound processing module 30 can receive the command and forward the incoming call to a live operator. As yet another non-limiting example, when the subscriber presses one or more keys on a telephone device that are associated with a leave message command, the inbound processing module 30 can receive the command and allow the particular subscriber to leave a voicemail for customer service or another party.

In another implementation, the subscriber can call a particular phone number and/or extension to subscribe to an autoresponder series of a particular campaign. As one non-limiting example, each of the campaigns managed by campaign module 24 can be assigned a unique telephone number and/or extension that can be used by the inbound processing module 30 to determine a particular one of the campaigns that the subscriber wants to join.

When inbound processing module 30 receives a subscribe command after the subscriber presses one or more keys associated with a subscribe command on the telephone device, the inbound processing module 30 can then add that subscriber to the campaign that is associated with the particular phone number or extension that was dialed by the subscriber.

Alternatively or additionally, inbound processing module 30 can allow a particular one of the subscribers to select an option to subscribe to one or more campaigns through voice input, such as by leaving a voice message, or otherwise speaking the information. Upon receipt of the voice input 29A, the inbound processing module 30 is operable to have the particular subscriber added to one or more of the campaigns based upon details extracted from the voice message. As one non-limiting example, the voice message can be programmatically transcribed from a voice format into a text format so that the particular one of the subscribers can be added to the subscriber module as a new subscriber. In other words, the subscriber simply leaves a voicemail with his name, email, or other information, and that information is converted from audio into text so that the subscriber can be added to the autoresponder series of a particular campaign. As another non-limiting example, the voice message can be listened to by a human, and the subscriber module 26 can receive input from the human to add the particular subscriber to one or more of the campaigns based upon the information contained in the voice message.

A non-limiting example of a fax/image 31F can be a traditional fax that is received over a telephone line. Another non-limiting example of a fax/image 31F can be someone's business card that has been scanned and imported into inbound processing module 30 (such as directly from a scanning device, from an email, fax, file upload, etc.). In one implementation, data that is contained in the fax/image 31F can be scanned by a computer to extract sufficient information to determine what campaign or other information the subscriber has requested, and to then programmatically add the subscriber to the requested campaigns. In another implementation, a human can review the fax/image 31F and update the system appropriately to provide the subscriber with the requested information. This could include adding the subscriber to subscriber module 26 and/or adding the subscriber to one or more campaigns in campaign module 24.

Tracking module 32 is responsible for allowing one or more campaign managers or other authorized users to view details about one or more of the campaigns and/or for generating reports related to that data. Such details that can be accessed regarding the campaigns can include the status of one or more campaigns, the number of messages that have been sent to what subscribers, the number of subscribers that have unsubscribed to the messages, the number of messages that could not be delivered by the voice broadcast or other specified method, etc.

Virtual seminar module 33 is operable to deliver virtual seminars to one or more subscribers of subscriber module 26 as desired. An exemplary implementation of virtual seminar module 33 is described in further detail in FIGS. 19-20.

In one implementation, autoresponder 12 is coupled to one or more subscriber computing devices 16A and 16B (referred to collectively herein as subscriber computing devices 16) over one or more network(s) 22. In such an implementation, subscriber computing devices 16 can receive one or more messages from autoresponder 12 (such as an email, a voice broadcast sent by email, etc.) and/or can manage one or more subscriber settings for autoresponder 12.

In yet another implementation, voice autoresponder system 10 includes an application programming interface 36, which allows one or more external systems 18 to integrate with and/or otherwise access one or more features of autoresponder 12 programmatically.

Turning now to FIGS. 2-27, the stages for implementing one or more implementations of autoresponder 12 are described in further detail. In some implementations, the processes of FIGS. 2-27 are at least partially implemented in the operating logic of computing device 800 (of FIG. 28). FIGS. 2-18 are simulated screens that demonstrate some exemplary implementations for autoresponder system 10. FIGS. 19-20 demonstrate some exemplary implementations for a virtual seminar playback system. FIGS. 21-27 demonstrate some implementations of autoresponders that support the distribution of messages in multiple formats.

Figure 2:
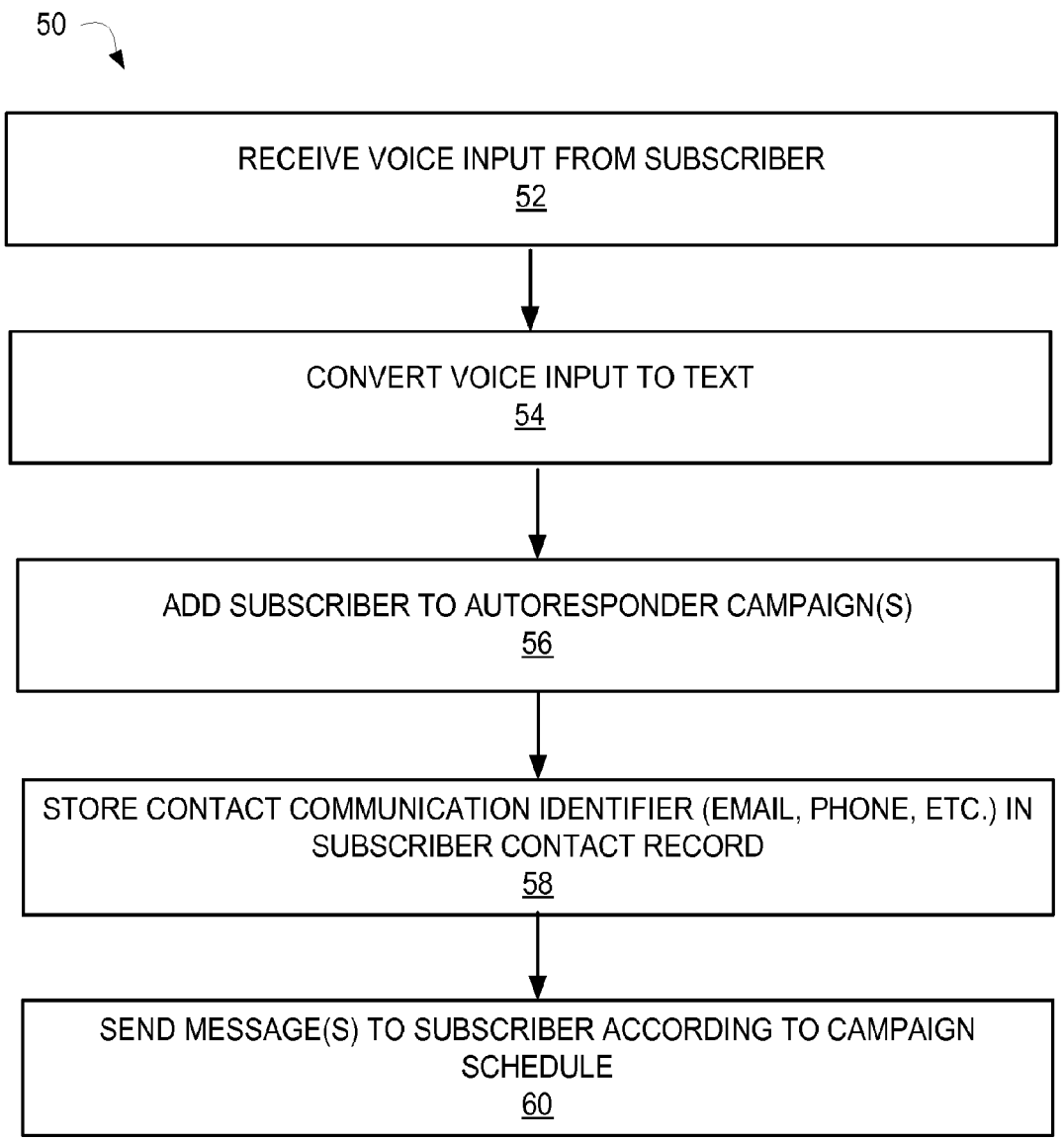
FIG. 2 is a process flow diagram for one implementation that illustrates the stages involved in subscribing to an autoresponder by voice input.

FIG. 2 is a process flow diagram 50 for one implementation that illustrates the stages involved in subscribing to an autoresponder by voice input. Voice input is received from a subscriber (stage 52). The voice input is converted to text (stage 54). A few non-limiting examples of voice input that can be converted to text can include the subscriber's name, email, phone number, and/or the type of information that is being requested. Some or all of the information may correspond to one or more data fields in the autoresponder system, or none of them may end up corresponding.

In one implementation, the voice input is saved into an audio file after or as it is being received from the subscriber, and the voice input is then performed by extracting text from the audio file through an automated speech-to-text translation process. In another implementation, the speech-to-text translation happens interactively as the subscriber speaks the information. In such an implementation, confirmation can be requested from the subscriber to have the subscriber confirm that an accurate translation has been made of the voice input. In other words, the system can let the subscriber know what information it extracted, and ask the subscriber to verify if that information was speech-to-text translation correctly understood the subscriber's voice.

The subscriber is then added to one or more autoresponder campaigns based upon information contained in the voice input (stage 56). The contact communication identifier(s) and/or other details for the subscriber are stored in the subscriber contact record (stage 58). The "contact communication identifier(s)" are the contact numbers/details for the subscriber, such as email address, home phone number, work phone number, cell phone number, or any other means that the subscriber has requested be used to contact the subscriber.

One or more messages are then sent to the subscriber according to the campaign schedule (stage 60) using at least one of the contact communication identifiers that the subscriber provided (or that was programmatically determined by an interaction the subscriber had with the system).

Figure 3:
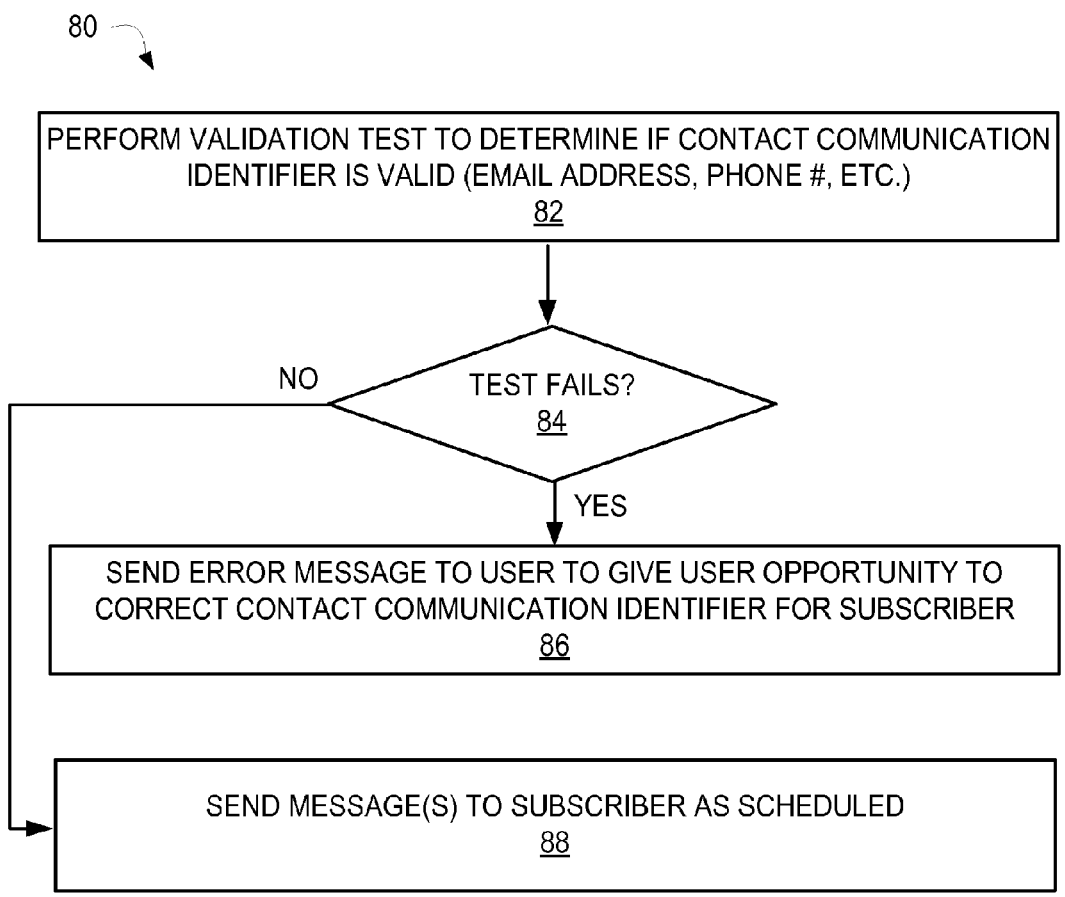
FIG. 3 is a process flow diagram for one implementation that illustrates the stages involved in performing a validation test on the information translated from the voice input.

Turning now to FIG. 3, a process flow diagram 80 for one implementation is shown that illustrates the stages involved in performing a validation test on the information that was translated from the voice input. A validation test is performed to determine if the contact communication identifier is valid (stage 82). As one non-limiting example, if the subscriber provided his/her email, then a test email message can be sent to that address to ensure that the system captured the information correctly (and/or that it is a valid address in general). If the subscriber provided his/her cell phone number, then a test can be sent in the form of an SMS text message to ensure that the number is valid and/or was received accurately.

If the test fails (decision point 84), then an error message can be sent to a user of the autoresponder system 10 (such as a customer support representative), to correct the contact communication identifier for the subscriber (i.e. to fix any typos and/or other issues there may be with it). If the test did not fail (decision point 84), then the messages are sent to the subscriber at that contact communication identifier as scheduled (stage 88).

Figure 4:
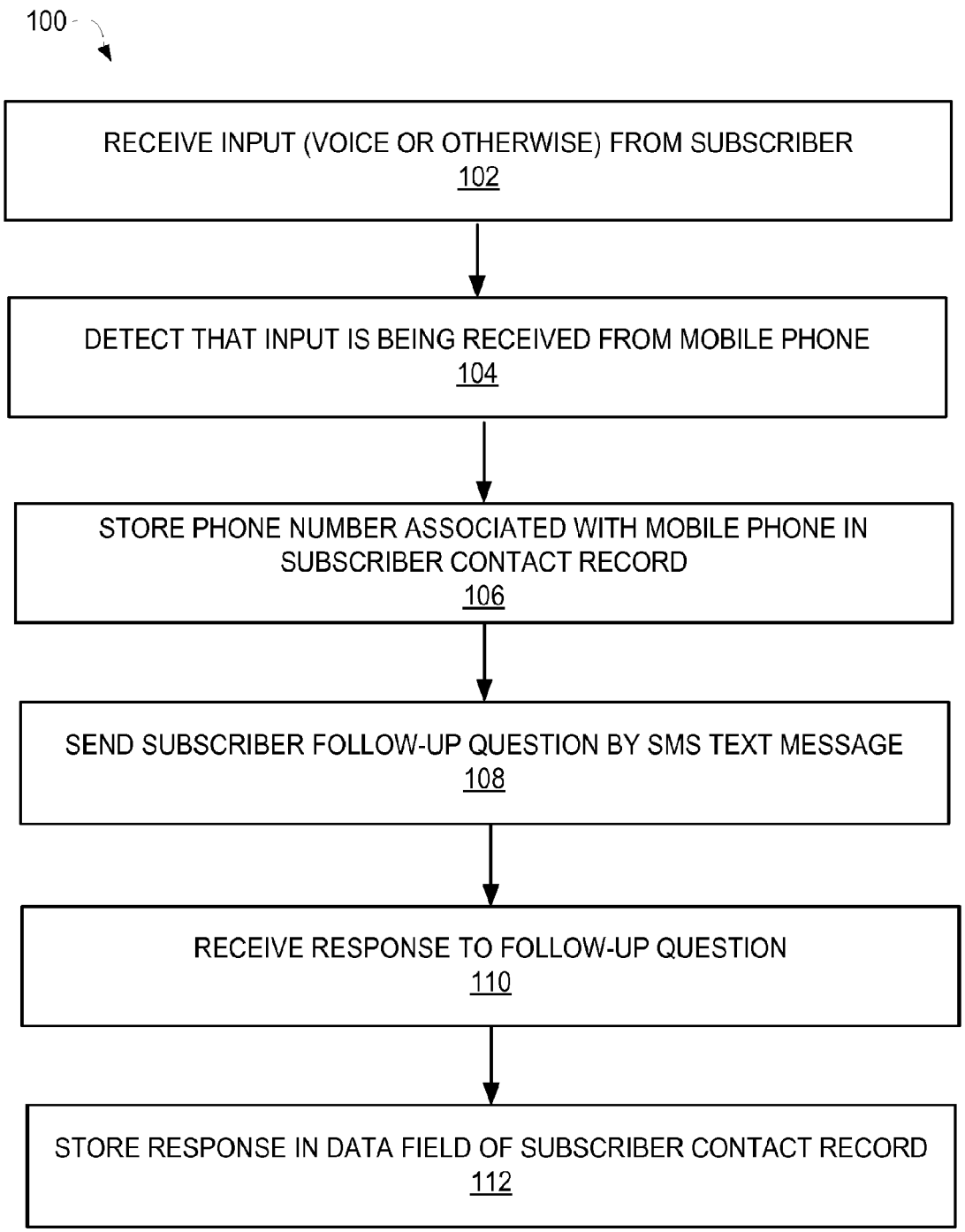
FIG. 4 is a process flow diagram for one implementation that illustrates the stages involved in automatically detecting that a subscriber has called the system from a mobile phone, and sending one or more SMS text messages as a follow-up.

FIG. 4 is a process flow diagram 100 for one implementation that illustrates the stages involved in automatically detecting that a subscriber has called the system from a mobile phone, and sending one or more SMS text messages as a follow-up. Input is received (by voice or otherwise) from a subscriber (stage 102). The system detects that the input is being received from a mobile phone of a subscriber (stage 104). A phone number that is associated with the mobile phone is stored in the subscriber contact record (stage 106). The subscriber is sent a follow-up question by SMS text message (stage 108). An example follow-up question could be "Hey [Name], what's your web site?"

Once a response is received to the follow-up question (stage 110), the response is stored in one or more data fields of the subscriber contact record (stage 112). In the case of the web site hypothetical, if the subscriber actually replies back with the web site, then it can be stored in a web site field on the subscriber record, as just one non-limiting example.

Figure 5:
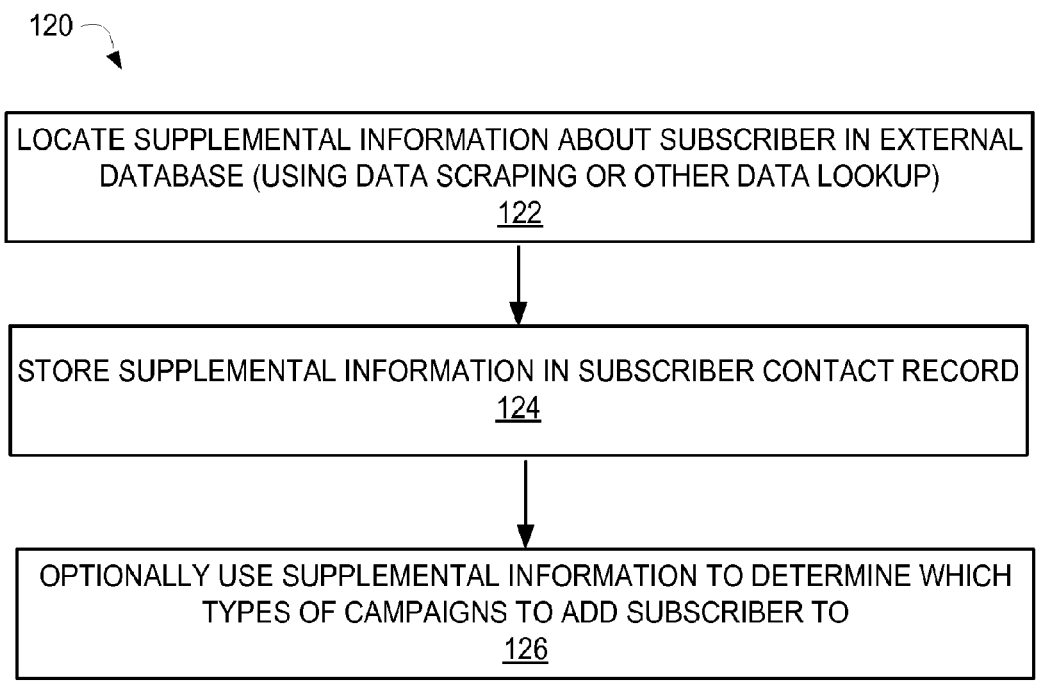
FIG. 5 is a process flow diagram for one implementation that illustrates the stages involved in programmatically retrieving additional data about the subscriber from an external database based upon information gathered from the subscriber.

FIG. 5 is a process flow diagram 120 for one implementation that illustrates the stages involved in programmatically retrieving additional data about the subscriber from an external database based upon information gathered from the subscriber. Supplemental information can be located about a subscriber in an external database (stage 122), such as using data that has been provided by the subscriber or retrieved programmatically by the system (such as the caller ID of a phone the subscriber used to call from). Supplemental information can be retrieved about the subscriber using data scraping technology, or another form of data lookup. The term "data scraping" as used herein is meant to include a technique in which a computer program extracts data from human-readable output coming from another program. Let's look at a few examples to illustrate this further. If you have the web site of the subscriber (such as from a SMS text message response described in FIG. 4, or that was otherwise gathered), data scraping can be programmatically performed to capture information about that web site. In the case of the subscriber's name, information can be looked up about the subscriber at one or more social media sites, such as Facebook, Twitter, etc. The popularity of the subscriber on these sites can be extracted. These are just a few non-limiting examples of the type of supplemental information that may be retrieved about the subscriber.

Once retrieved, one or more portions of the supplemental information can then be stored in the subscriber contact record for later use (stage 124). Once obtained, this supplemental information can be used for various purposes, such as to determine which types of campaigns to add the subscriber to (stage 126).

Figure 6C:
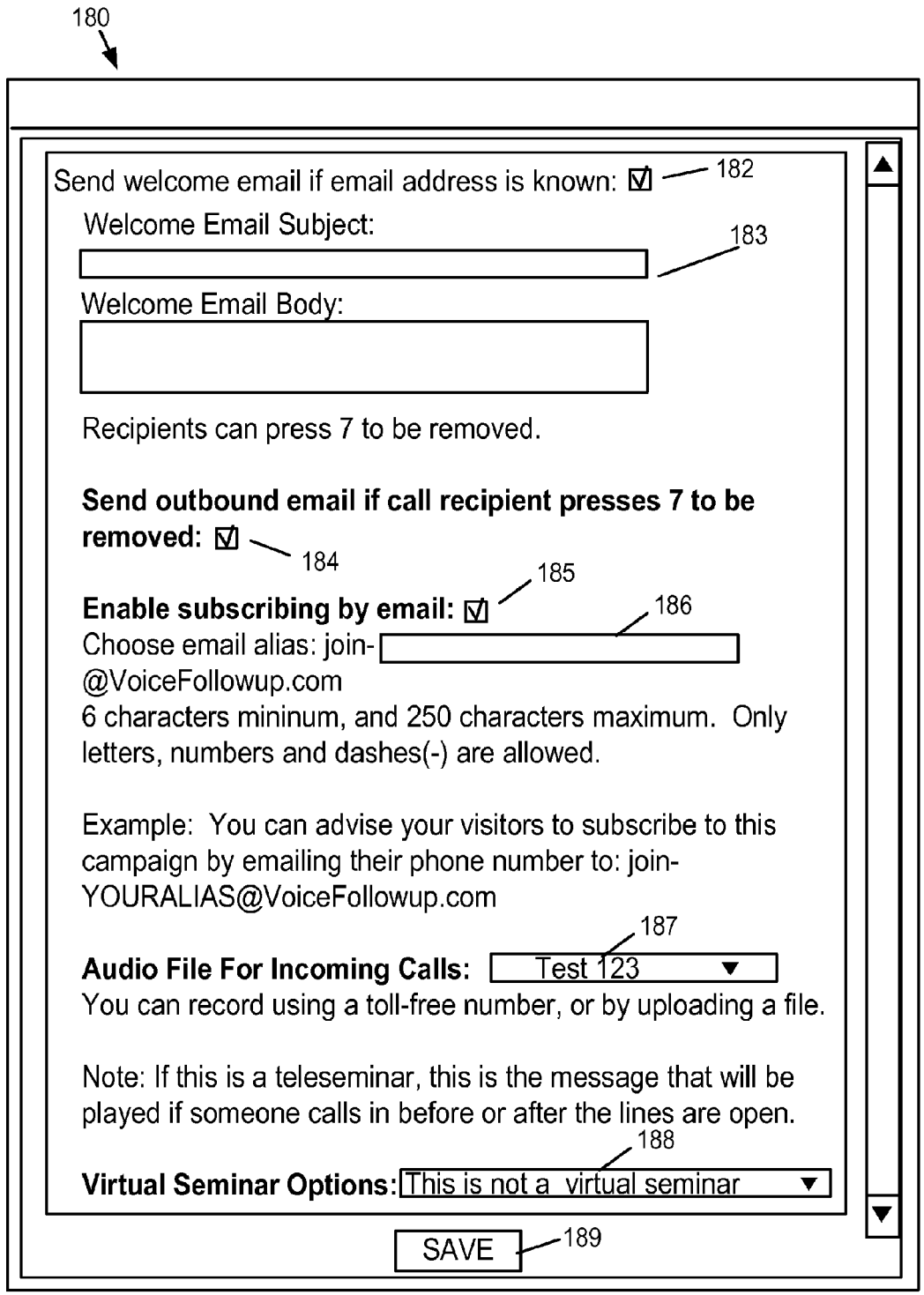

FIGS. 6A-6C are simulated screens for one implementation that illustrate adding a new campaign to an autoresponder system. As shown in simulated screen 150 of FIG. 6A, details about a new campaign can be specified, such as campaign name 152, the from name, and the from email that should be displayed with the voice broadcast. The incoming phone number that subscribers can use to subscribe to this campaign by telephone 154 is specified.

The outbound caller ID number 156 can also be specified. This indicates what number should be displayed on the caller ID of the subscriber's phone when the voice broadcast is sent to the subscriber. A transfer to live operator option 158 is also shown, which enables the subscriber to reach a live operator (either automatically, or by pressing the "1" key, in this example). When live operator option 158 is selected, a phone number that the call should be transferred to can also be specified 162. In other words, the phone number associated with the live operator can be specified when the transfer to live operator option 158 is used. In this example, options are provided for transferring the call automatically 160, or only when the subscriber selects an option to reach an operator.

Another option displayed on simulated screen 150 is the ability to have voicemail transcripts to be sent to one or more email addresses 164. For example, when attach audio file 166 is selected, the email address 168 will receive an email that contains an audio file of the voicemail that the subscriber left when they were subscribing to this campaign (or attempting to do so). When errors are detected, having this audio file can be a very helpful way of correcting any speech-to-text translations that may not have been done correctly.

Continuing with FIG. 6B, some additional exemplary options that can be specified for a new campaign are displayed on simulated screen 170. An email address can be specified for receiving SMS text message replies 172. Custom fields 174 can also be specified, such as to capture additional data elements from the subscribers that are appropriate for the particular campaign. When the enable KDA option 175 is checked for a particular custom field, then keyword density analysis can be utilized. Keyword density analysis means that the responses that are provided by subscribers can be tracked and analyzed in the aggregate to determine which key words are commonly appearing. This analysis can help identify areas that new content or help should be offered to subscribers.

An option can also be specified to what campaign the subscriber should be added to 176 if they leave a voicemail. Another option can be specified regarding what campaign, if any, the subscriber should be removed from 177 when they join the campaign. As another option, if the recipient speaks their email address when leaving a voicemail, they can be subscribed to the autoresponder specified in autoresponder email address 178.

Continuing with FIG. 6C, simulated screen 180 illustrates some additional options for the new campaign. For example, a welcome email can be sent when indicated 182, and with the specified welcome message 183. An email notification 184 can be sent if the recipient selects an option to be removed. Subscription by email option 185 can be selected when subscribers can join this campaign by email. To join by email, subscribers can email the specified email address 186 that is associated with the campaign.

An audio file 187 to be used for incoming calls can be specified. This is the audio file that the subscriber hears when they call the number to join the campaign. In one implementation, virtual seminar option 188 can be specified to indicate whether or not this campaign is to be treated as a virtual seminar, such as a teleseminar or webinar. Upon pressing the save option 189, the new campaign is saved to the system.

Figure 7:
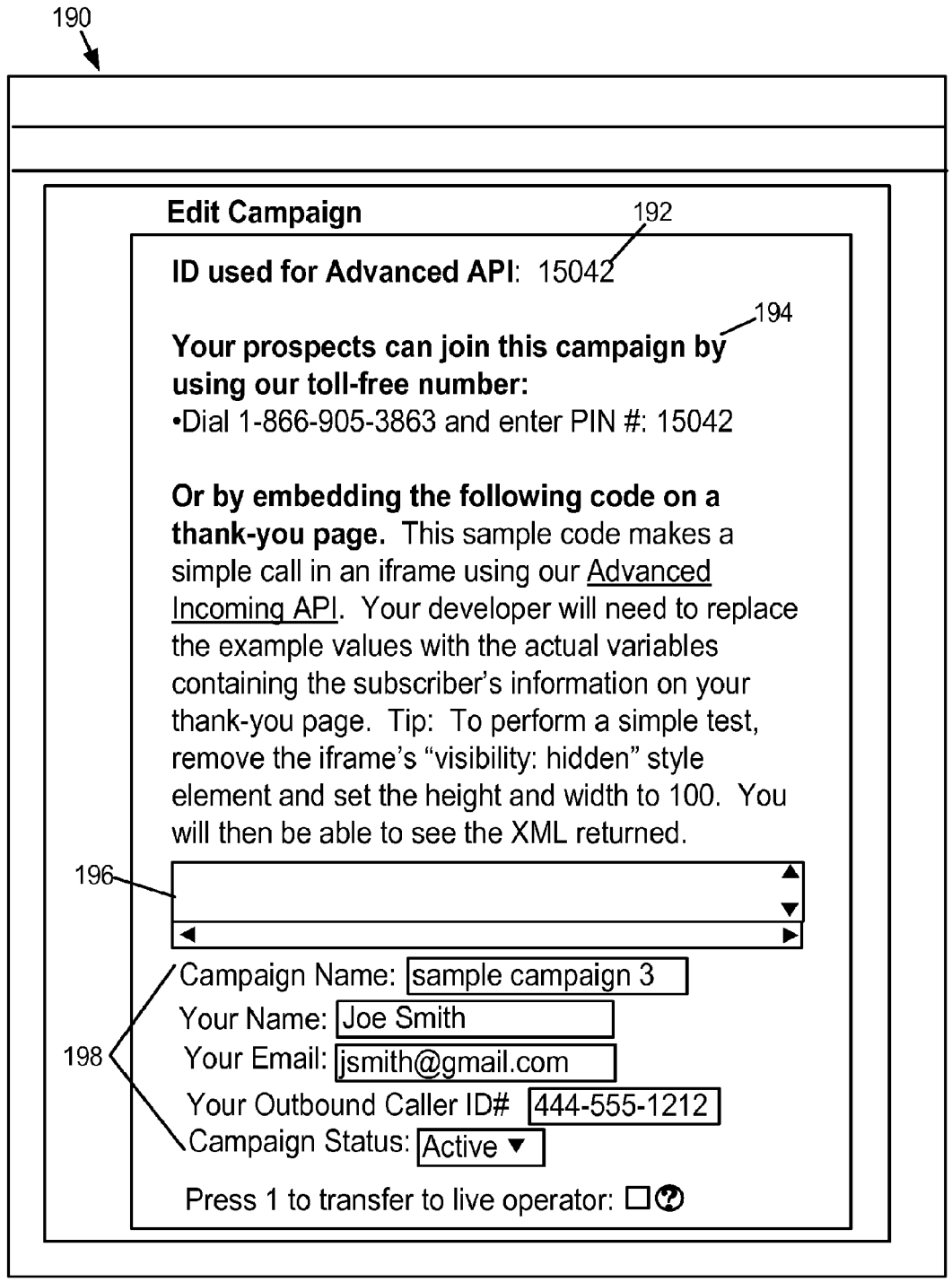
FIG. 7 is a simulated screen for one implementation that illustrates editing an existing campaign of an autoresponder system.

FIG. 7 is a simulated screen 190 for one implementation that illustrates editing an existing campaign of an autoresponder system. Once a new campaign has been added, such as using the screens shown in FIGS. 6A-6C, the campaign can then be edited at a later point in time, such as using simulated screen 190. Just a portion of this screen is illustrated for the sake of clarity. In this example, an ID to be used for an application programming interface 192 has been assigned. This ID can be used by external software applications or commercial services via an API (Application Programming Interface) that need to refer to this campaign by a particular identifier. Details about a toll free number 194 and pin number are displayed that specify how people can subscribe to this particular campaign by telephone. HTML or other programming code 196 is also displayed that can be embedded into another web page to allow people to subscribe to this campaign. Details about the campaign 198, such as campaign name, from name, from email, and outbound caller ID are also displayed. These settings can be edited as desired to refine the voice broadcast campaign over time.

Figure 8:
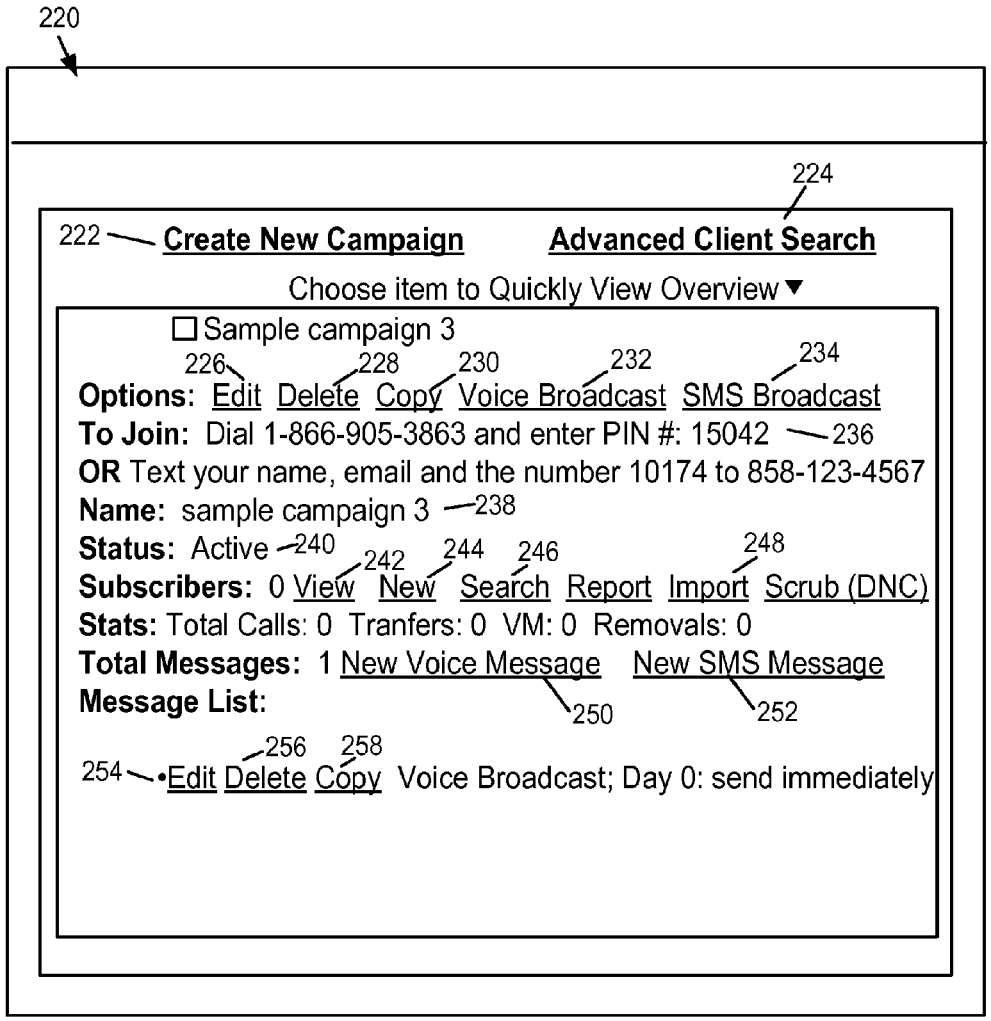
FIG. 8 is a simulated screen for one implementation that illustrates details about existing campaigns, including some details about subscribers associated with the campaign.

FIG. 8 is a simulated screen 220 for one implementation that illustrates details about existing campaigns, including some details about the subscribers that are associated with the campaign. In one implementation, these details can be accessed from tracking module 32. Various campaign options are displayed on the screen, such as a create new campaign option 222 and advanced client search option 224. Various details about one or more campaigns are also displayed, such as options for editing 226, deleting 228, copying 230 data for a selected campaign, creating a voice broadcast 232, creating an SMS text broadcast 234. Details on how subscribers can join a particular campaign are displayed, such as the phone number and/or pin number 236 of the campaign.

Other details including the name of the campaign 238 and its status 240 are also displayed. Subscriber data and options are also displayed, such as the number of subscribers, an option to view 242 a list of those subscribers, add a new subscriber 244, import subscribers 248, and an option to scrub the subscriber list against a do not call list. The scrub against a do not call list is described in more detail in FIG. 9. The number of voice broadcast messages and SMS text messages in the particular campaign is displayed, along with an option to create a new voice message 250 or new SMS text message 252 for that campaign. A list of existing voice and SMS text messages in the campaign are also listed, along with options for editing 254, deleting 256, or copying 258 the message. These are just a few examples of the types of tracking and/or management of one or more campaigns that can be offered.

Figure 9:
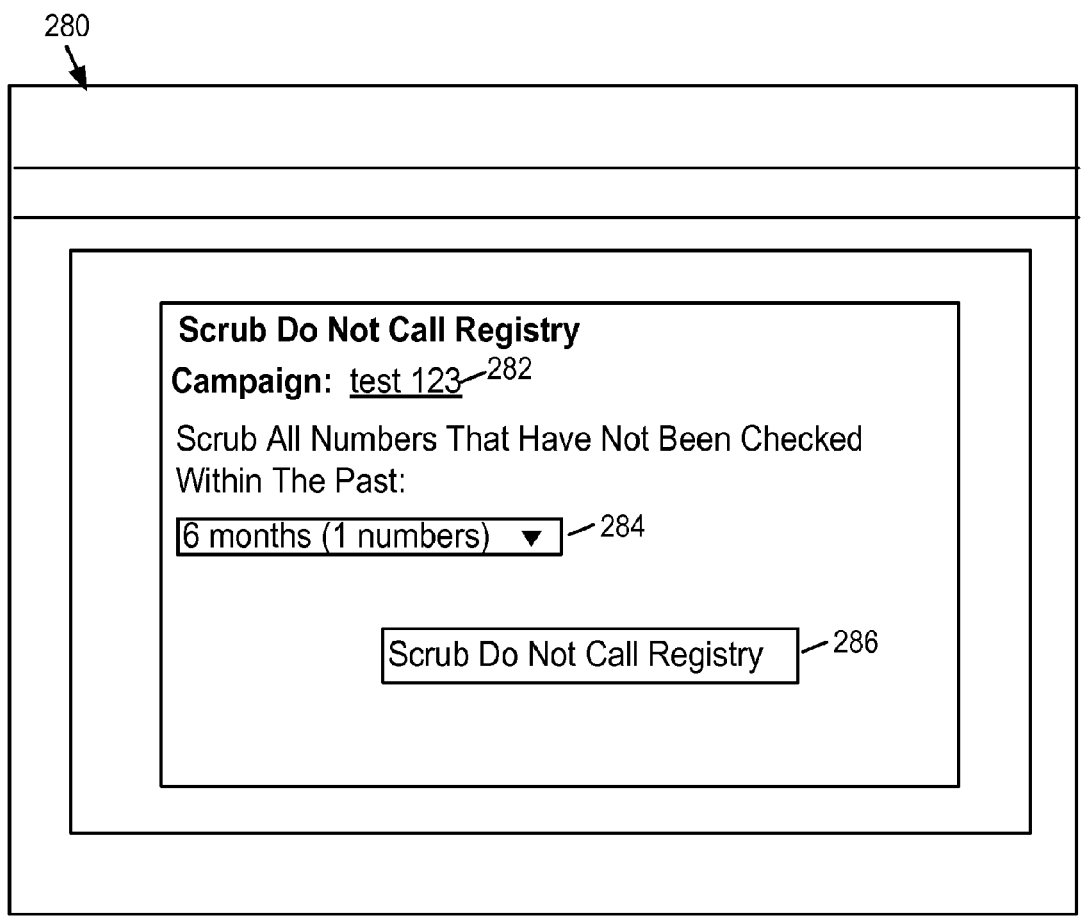
FIG. 9 is a simulated screen for one implementation that illustrates removing subscribers from a subscriber list based upon data from a do not call registry.

FIG. 9 is a simulated screen 280 for one implementation that illustrates removing subscribers from a subscriber list based upon data from a do not call registry. There are some governmental regulations that allow people to specify that they do not want to be called by telephone unless it has been pre-authorized. These lists of people who have asked to not be contacted by telephone are often referred to as "do not call lists". Simulated screen 280 allows for a subscriber list associated with a selected campaign 282 to be scrubbed against a do not call list. An option 284 can be specified to indicate a timeframe that should be used for scrubbing the data. Then, once the scrub option is selected 286, any names that are found in the subscriber list for the selected campaign 282 that are also present in a do not call registry can be removed from the list so that those particular subscribers do not receive voice broadcasts.

FIG. 10 is a simulated screen 300 for one implementation that illustrates some exemplary options for adding a new SMS text message to a campaign of an autoresponder system. Details about the SMS text message, such as the send interval 302 and text of the message to be sent 304 can be specified. Various custom tags can be used to customize/personalize the SMS text message that gets sent to the subscriber(s). These custom tags can be inserted into the body of the message to be sent 304.

If the option to allow replies to SMS 306 is checked, then various options are enabled to allow additional follow-up messages to be sent as well. For example, a particular field in the subscriber contact record 308 can be populated with a response that is received from the subscriber to one of the questions. A resend option 310 can be specified if the message should be re-sent. An option to indicate whether numeric replies are expected 312 is also provided. Numeric replies enable quizzes and other types of polls to be performed and tallied based upon numeric responses. An option is provided to allow another follow-up message to be sent 314 by SMS text message if the first response is received. Another option provided on simulated screen 300 is an option 316 that specifies whether or not the SMS text message(s) should be sent to existing subscribers of the particular campaign, or just added to the message sequence.

Figure 11:
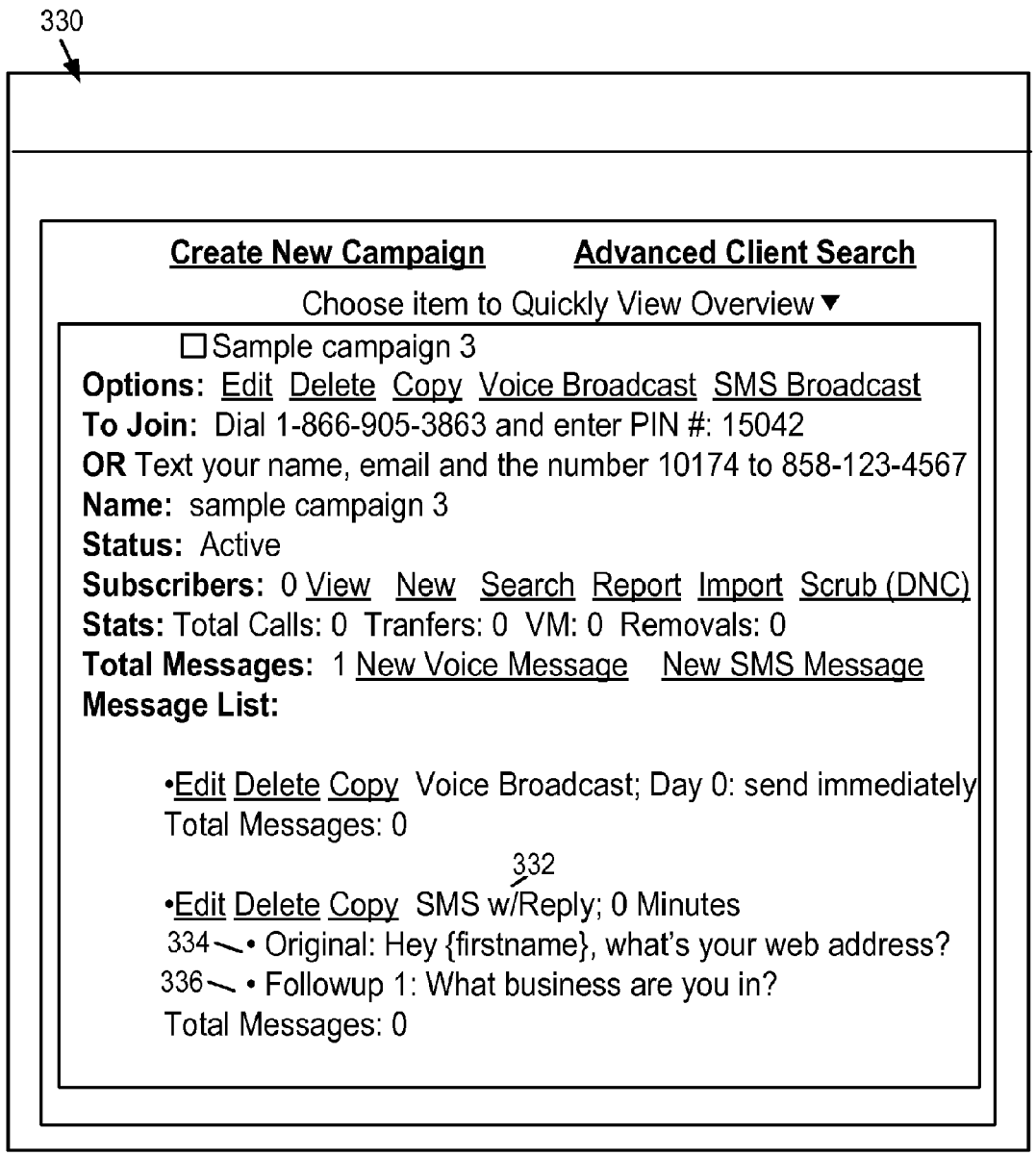
FIG. 11 is a simulated screen for one implementation that illustrates details about existing campaigns, including some details about a newly added SMS text message.

Turning now to FIG. 11, a simulated screen 330 is shown for one implementation that illustrates details about existing campaigns, including the newly added SMS text message that was created based upon the example in FIG. 10. Details about the newly added SMS text message are shown 332, such as the text of the original SMS text message 334, and the follow-up text message 336.

Figure 12A:
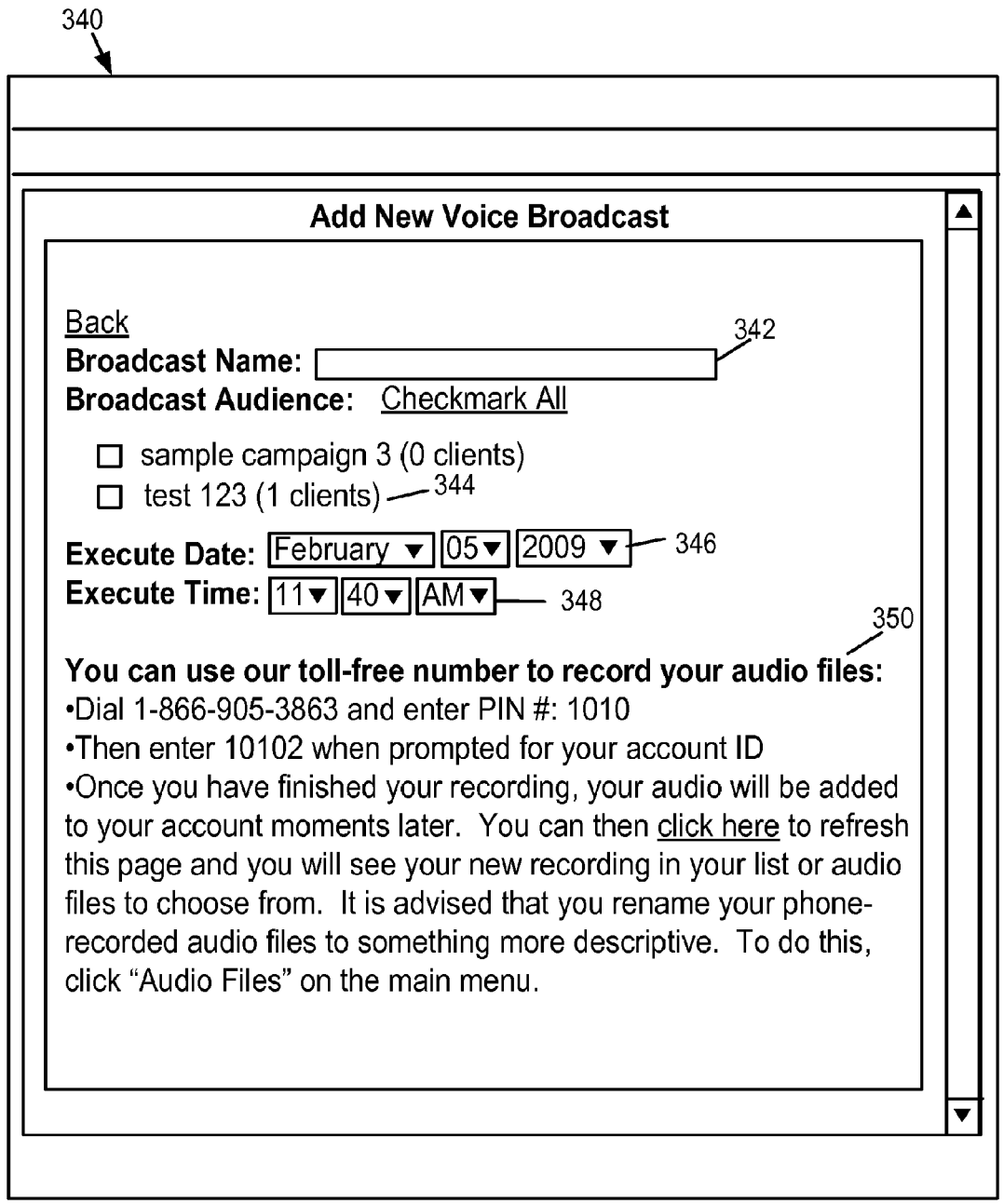
FIGS. 12A-12B are simulated screens for one implementation that illustrate adding a new voice broadcast to an autoresponder system.
Figure 12B:
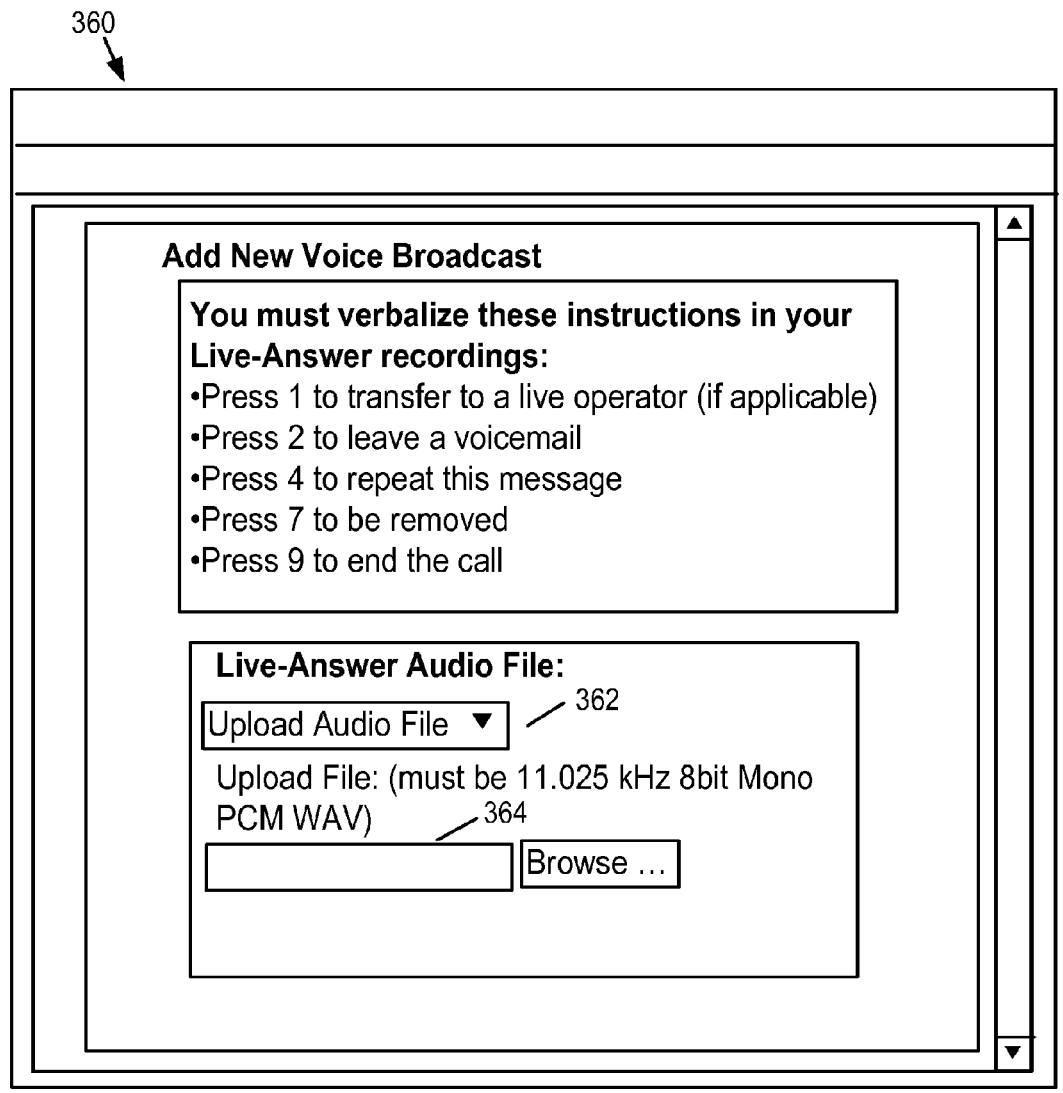

FIGS. 12A-12B are simulated screens for one implementation that illustrates adding a new voice broadcast to a voice autoresponder system. Beginning with simulated screen 340, a new broadcast can be created by specifying various details, such as the broadcast name 342, the subscriber list 344 that this voice broadcast should be sent to, the date 346 the voice broadcast should be sent, and the time 348 the voice broadcast should be sent on that date 346. In one implementation, the time 348 for the voice broadcast is based upon a time zone associated with the subscriber, such as to ensure that the subscriber does not receive broadcasts during the middle of the night or at another time that would be potentially disturbing. In another implementation, the time 348 that the voice broadcast is sent is based upon a time zone specified by an administrator or associated with the account or a computer of the voice broadcast system. Other time zone possibilities could also be used. In addition to specifying the broadcast name, subscriber list, and execute date and time, simulated screen 340 also displays instructions for how the user can record the voice broadcast by leaving a voicemail 350 at a particular telephone number.

Continuing with FIG. 12B, simulated screen 360 provides an option to allow the user to upload an existing audio file 362 (as an alternative to recording the message by leaving a voicemail). Once uploaded, the audio file will be displayed in field 364.

Figure 13A:
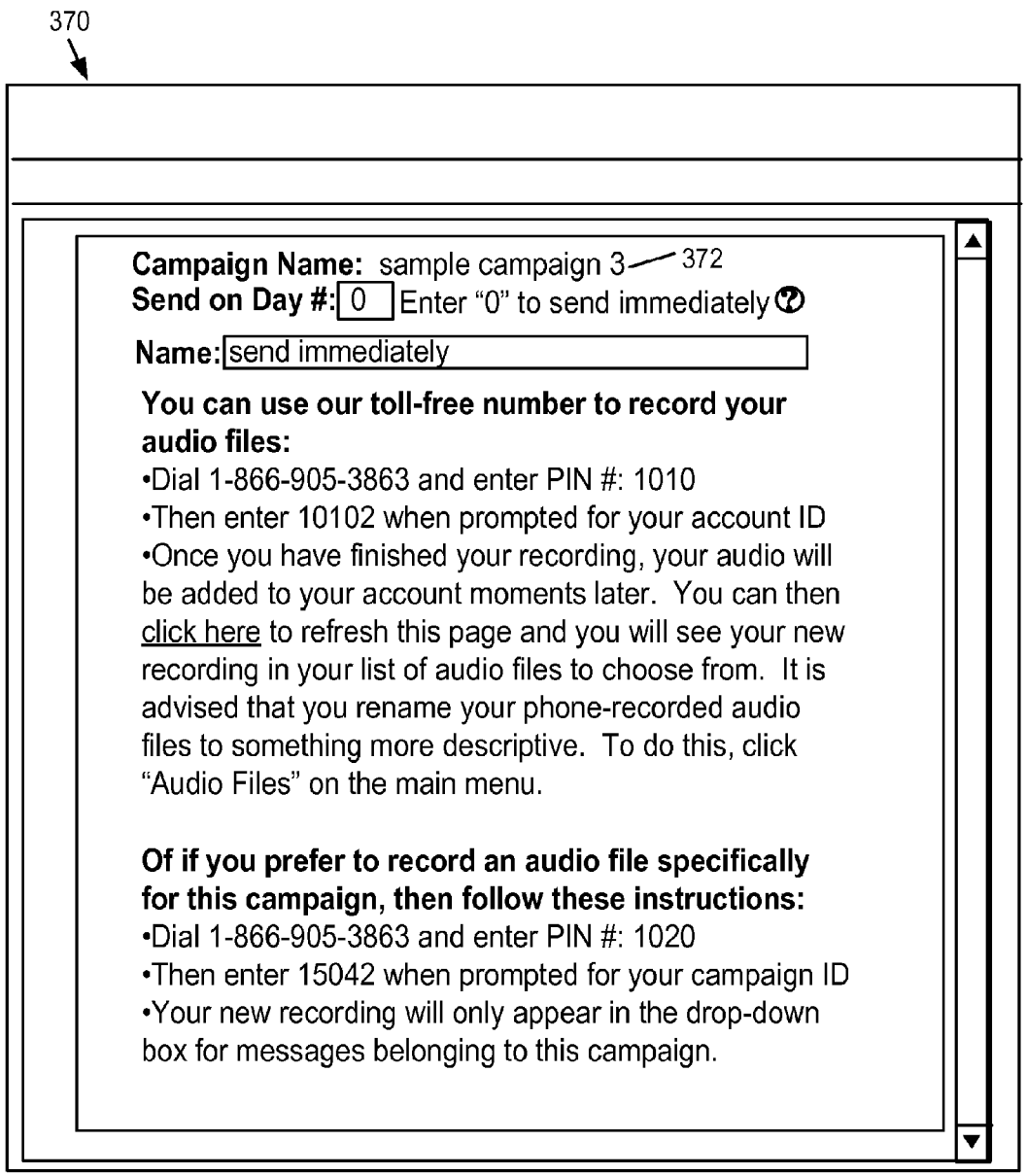
FIGS. 13A-13B are simulated screens for one implementation that illustrate editing a message of an existing campaign.
Figure 13B:
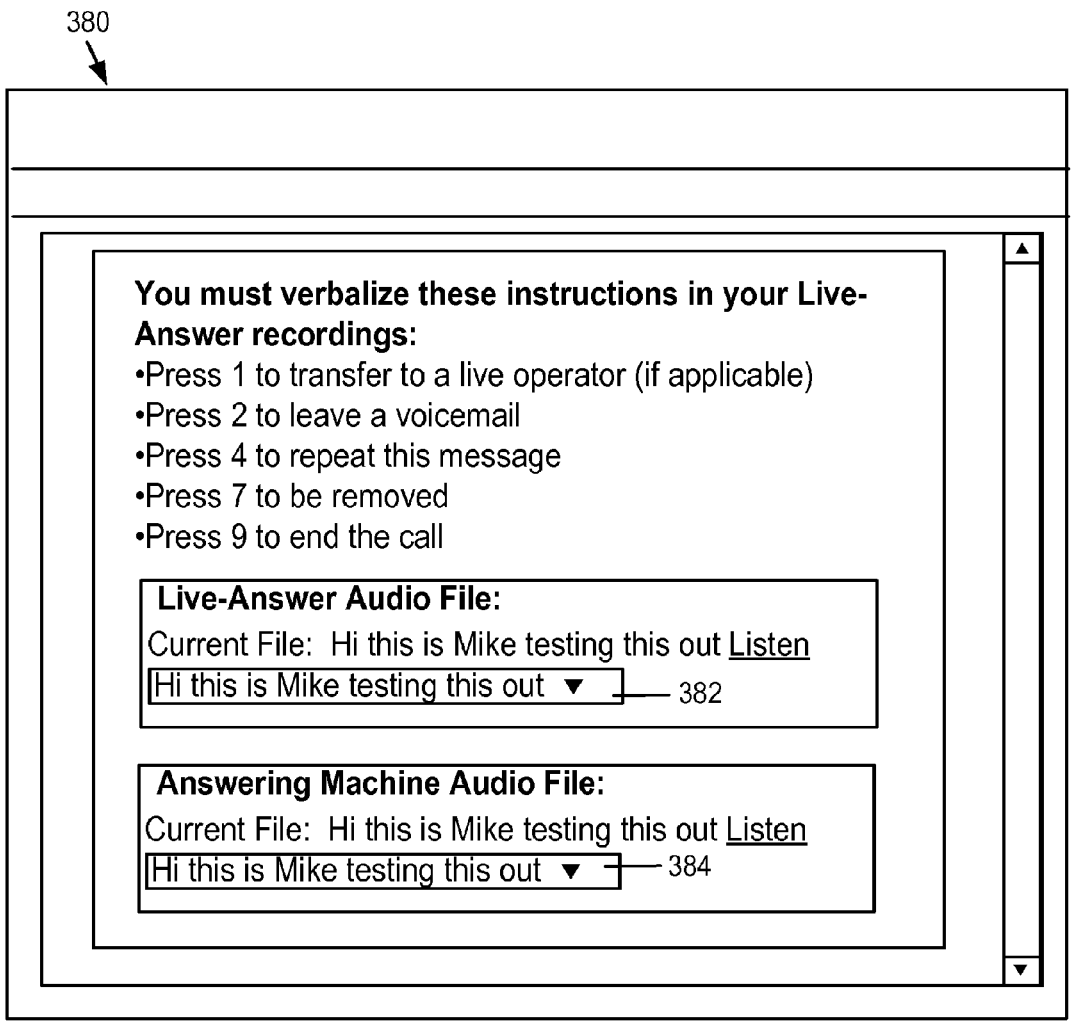

Turning now to FIGS. 13A-13B, simulated screens are shown for one implementation that illustrate editing a message (such as a voice broadcast message) of an existing campaign. In other words, once a voice broadcast message has been created, such as using screens FIG. 12A-12B, that message can be further edited at a later time. Beginning with simulated screen 370 of FIG. 13A, the campaign name 272 is displayed, along with other details about when the message will be sent. The details about how to record the voice broadcast by leaving a voicemail are also displayed. Continuing with FIG. 13B, simulated screen 380 displays the files that have been previously uploaded as the live-answer audio file 382 and the answering machine audio file 384 are also displayed. From this screen, the user can listen to the existing voice broadcast and/or upload a new audio file to be used for the broadcast. Once the user is happy with the voice broadcast, the changes can be saved so that they take effect for future voice broadcasts that are sent out.

FIG. 14 is a simulated screen 390 for one implementation that illustrates adding a new SMS broadcast to an autoresponder system. In other words, simulated screen 390 can be used to broadcast an SMS text message out to the specified broadcast audience. The text of the message 391 can be specified, along with various other options. For example, the option can be selected to indicate whether or not to allow replies 392 to the SMS text message. Details 394 about a reply that should be sent back to any subscribers that respond can also be specified. These reply options were explained in further detail in FIG. 10. The broadcast audience 396 that the SMS text message should be sent to are specified, as well as the execute date 397 and the execute time 398 that indicate when the message should be sent. In this example, to send the SMS text message broadcast immediately, the default values can just be accepted, although other ways could also be used to indicate an immediate sending of the message. Once the new SMS broadcast is saved using save option 399, then SMS text message broadcast will then be sent to the specified broadcast audience 396 according to the other settings that were specified on simulated screen 390.

Turning now to FIGS. 15-18, some example implementations are shown of autoresponder system 10 that allow for creation and/or allocation of telephone numbers for use with campaigns. FIGS. 15-18 offer just a few non-limiting examples, and any other suitable manner of creating and/or editing phone numbers for use with one or more autoresponder campaigns could also be used in other implementations.

Figure 15:
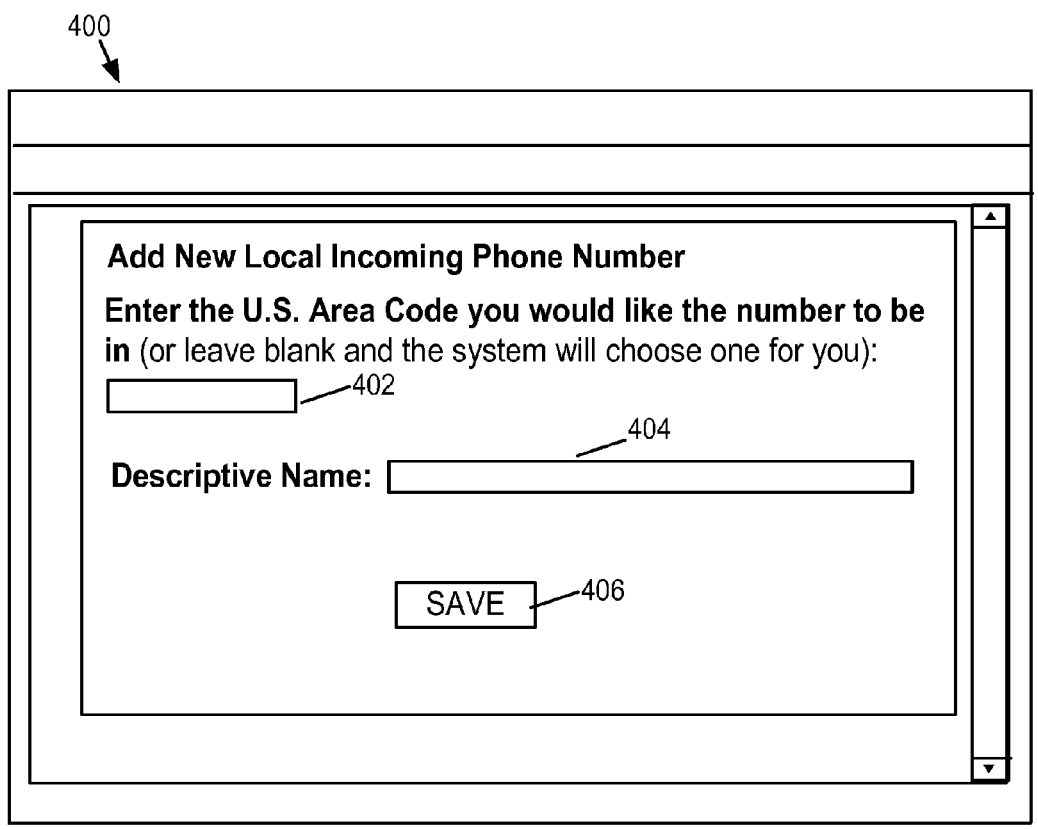
FIG. 15 is a simulated screen for one implementation that illustrates allocating a new phone number to be used with one or more campaigns in an autoresponder system.

FIG. 15 is a simulated screen 400 for one implementation that illustrates allocating a new phone number to be used with one or more campaigns in autoresponder system 10. The user can enter the area code 402 that the new number should be based in, or just leave it blank to have the system pick an area code. In the example shown, the user can also specify a descriptive name 404 to be used for the telephone number. Upon selecting save option 406, the new phone number is allocated for use.

Figure 16:
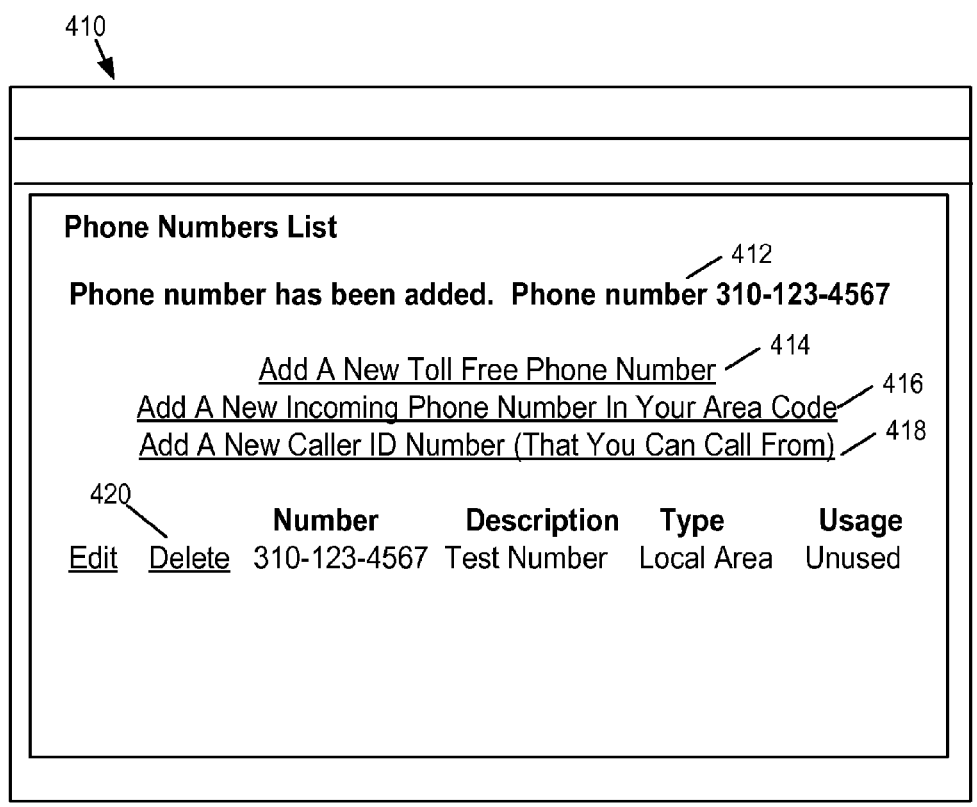
FIG. 16 is a simulated screen for one implementation that illustrates a new phone number having been allocated.

Turning now to FIG. 16, a simulated screen 410 for one implementation is shown that illustrates a new phone number having been allocated in the specified area code 412. The phone numbers list also shows other options, such as an option to add a new toll free number 414, an option to add a new incoming phone number in your area code 416, and an option to add a new caller ID number (that you can call from) 418. The new number that was just allocated 420 is also displayed in the list, and can be edited as desired.

FIG. 17 is a simulated screen 430 for one implementation that illustrates using the newly added phone number as part of a campaign in autoresponder system 10. In this example, the incoming phone number 432 can be chosen to use the new number that was just allocated for this campaign. In this example, we want to forward all calls to another number, but track it through a campaign. So the transfer to live operator option 434 is checked, and the option to transfer calls automatically 436 is also checked. The phone number to transfer the calls to 438 is also specified.

Figure 18:
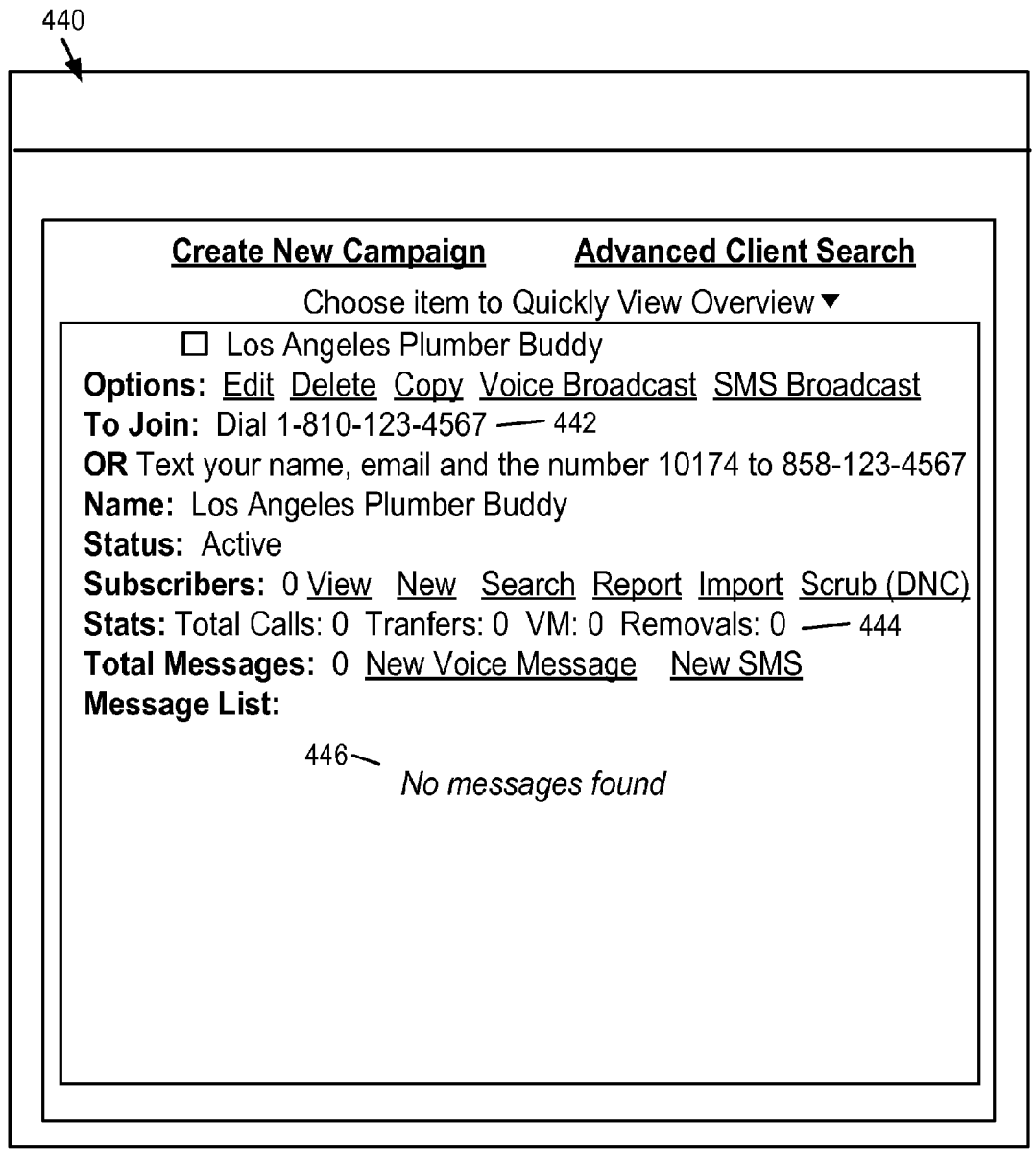
FIG. 18 is a simulated screen for one implementation that illustrates the newly created campaign that uses the newly added phone number to track calls through the campaign and other details.
Figure 19:
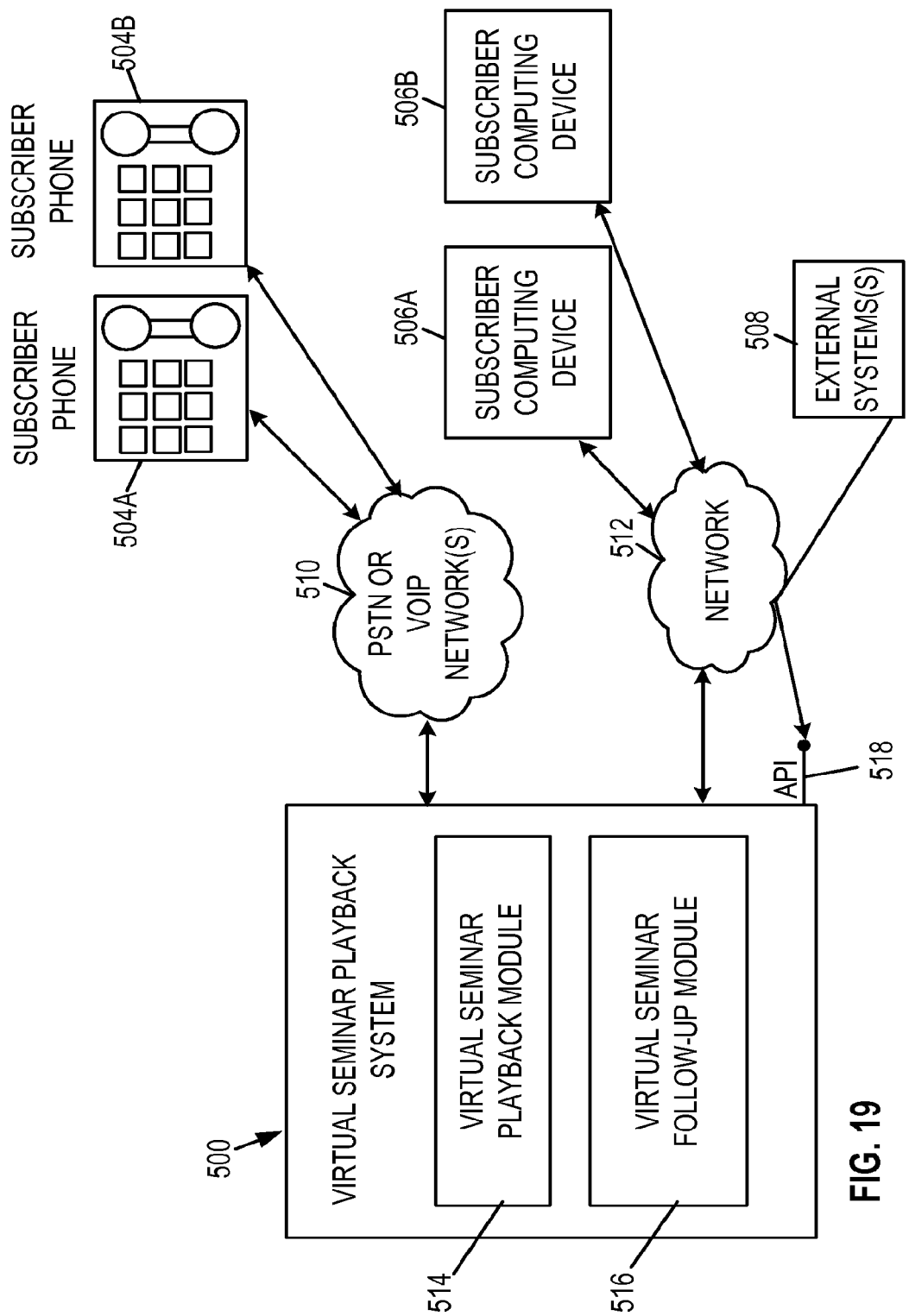
FIG. 19 is a diagrammatic view of a virtual seminar playback system.

As shown in simulated screen 440 of FIG. 18, the newly created campaign that uses the newly added phone number 442 can now track calls through the campaign 444 and other details 446. For example, a new phone number can be allocated and then used by a particular campaign for a particular marketing promotion you are running, so you can see how many calls were generated by that campaign. The calls can still be routed to another number as desired, but by using the allocated phone number that is assigned to the campaign, you can track a lot of useful details about the campaign. This is just one of many examples of how the phone number allocation feature could be used with autoresponder system 10.

Turning now to FIGS. 19 and 20, a virtual seminar playback system is described. In one implementation, virtual seminar playback system is part of autoresponder system 10. In another implementation, virtual seminar playback system can operate independently of autoresponder system 10.

FIG. 19 is a diagrammatic view of a virtual seminar playback system 500. Virtual seminar playback system 500 has a virtual seminar playback module 514 that is operable to allow subscribers to access a playback of a media recording over a communication connection, such as from subscriber phones 504A or 504B over a packet switched telephone network (PSTN) and/or a Voice-Over-IP telephone network 510, and/or from subscriber computing devices 506A or 506B over network connection 512. A media recording can include any type of media file that has a timeline of data that can be played back, such as an audio file, movie file, etc. In one implementation, the virtual seminar can be a teleseminar, with one or more audio files being made accessible for playback at the scheduled time to subscribers who access the playback over a telephone or other communication connection. In another implementation, the virtual seminar can be a webinar, with a combination of video, audio, and/or other files being made accessible for playback to subscribers at the scheduled time who access the playback over an Internet or other communication connection.

Virtual seminar playback module 514 allows the playback to be scheduled to begin at a specific start time and last for a specific duration. The virtual seminar playback module 514 ensures that when a particular one of the subscribers accesses the playback at a point in time that is after the specific start time, but before the playback has passed the specific duration, the media recording is delivered to the particular one of the subscribers starting at a point in the media recording that corresponds to a delay interval.

In other words, virtual seminar playback module 514 is responsible for calculating the delay interval, and then transmitting the playback data for the media recording at a corresponding point in the media recording that corresponds to the delay interval. The term "delay interval" as used herein is meant to include an amount of time after a scheduled start time. In one implementation, the delay interval is calculated by determining how late the subscriber accessed/joined the virtual seminar after the scheduled start time, and then using that amount of time as the delay interval. In such an implementation, if the subscriber joined 5 minutes after the scheduled start time, the delay interval would be 5 minutes, and they would start receiving the contents of the virtual seminar that is contained at the timestamp of 5 minutes within the media recording. In other implementations, the delay interval may not correspond identically to the amount of time that the subscriber joined after the start time. For example, the delay interval could be some number greater or less than the amount of time that the subscriber delayed in accessing the virtual seminar after the specified start time. The delay interval could be calculated based upon a number of factors or logic.

In some implementations, additional steps need to be taken to initiate the playback at the delay interval, such as when the media recording and/or the technology that is used to handle its playback are not able to advance to a specific point in time in the recording based upon the delay interval. In such implementations, different versions of the media recording can be generated and/or stored that contain different portions of the playback. As one non-limiting example, one version of the file may contain the entire recording, while another version of the file may have content that starts 1 minute late and is thus missing the first minute of the entire recording, etc. Here is a non-limiting example of how these files could be used in such a scenario. When a particular subscriber joins one minute late, the version of the media recording that has been shortened by one minute could be delivered to the subscriber since the subscriber had joined one minute late.

In one implementation, a virtual seminar follow-up module 516 is included, and is operable to send follow-up messages to subscribers based upon the actions they took during the virtual seminar. As one non-limiting example, for any subscribers who had signed up for the virtual seminar, but who joined after the scheduled start time (i.e. late), virtual seminar follow-up module 516 could send them a certain type of follow-up message(s), such as an email that can be accessed by subscriber from subscriber computing device 506A or 506B over network 512. As another non-limiting example, for any subscribers who had signed up for the virtual seminar, but who did not join at all, virtual seminar follow-up module 516 could send them another type of follow-up message(s). In one implementation, virtual seminar playback system 500 contains an API 518 that allows external systems 508 to make use of functionality offered by virtual seminar playback system 500. FIG. 20 includes additional illustrations of how virtual seminar playback system 500 could be used.

FIG. 20 is a simulated screen 540 for one implementation that illustrates creating a particular virtual seminar playback with specified options. In one implementation, a particular virtual seminar playback could be assigned to a particular campaign in an autoresponder for tracking and/or other purposes. In another implementation, a particular virtual seminar playback could be implemented independently of any particular campaign.

In simulated screen 540, there are various options that can be specified for the virtual seminar playback. For example, the media file to use for incoming calls before the virtual seminar starts 544 can be specified, or can be listened to by selecting the listen option 542. The frequency 546 of the virtual seminar can be specified, such as whether this is a one-time or recurring teleseminar, and/or a one-time or recurring webinar. The virtual seminar date 548, time 550, duration 552, and/or an option for specifying when the virtual seminar channel/lines should open 554 can be selected. In this example, the duration of the virtual seminar will be the duration that the media recording for the main part of the virtual seminar lasts. And the time specifying when the virtual seminar channel/lines should open 554 indicates at what point subscribers are allowed to access/join the virtual seminar.

One or more follow-up messages can be sent by virtual seminar follow-up module 516, as discussed in FIG. 19. Options 556, 558, 560, and 562 allow the user to specify different campaigns that users who do not attend, who arrive late, who left early, and/or who completed the virtual seminar should receive. These are just a few non-limiting examples of the types of follow-up messages that can be sent to subscribers based upon their actions.

A pre-seminar media recording 564 can also be uploaded or otherwise specified. An option to listen to or watch 566 the pre-seminar media recording is also provided. The pre-seminar media recording is what gets played after the lines/channels for the virtual seminar have been opened, but before the main part of the virtual seminar begins. For example, this could be introduction by the speaker that says, "Hey, it's Mike, and we're going to wait a few more minutes until the seminar is supposed to start. But I just wanted to let everyone know that I'm here and excited to talk with you". In one implementation, the pre-seminar media recording 564 can be set to loop multiple times until the virtual seminar actually begins.

The virtual seminar media recording 568 can also be uploaded or otherwise specified. An option to listen to or watch 570 the virtual seminar media recording is also provided. The virtual seminar media recording 568 is the file that contains the main part of the virtual seminar. In some implementations, the preseminar media recording 564 and the virtual seminar media recording 568 can be the same file.

Once the virtual seminar settings have been specified as desired, the user can select the save option 572 to create and/or update the virtual seminar. Once the virtual seminar has been created, subscribers can access the virtual seminar at the scheduled time over the using the specified connection information. For example, in the case of a teleseminar, subscribers can dial the assigned telephone number (and optional access code, depending on the specific implementation) and listen to the virtual seminar at the scheduled time. In the case of a webinar, subscribers can access the web site with a dedicated URL or access code that is designed for the webinar and/or can dial in by telephone, depending on the webinar implementation.

Turning now to FIGS. 21-27, some implementations of autoresponders are described that support the distribution of messages in multiple formats.

Figure 21:
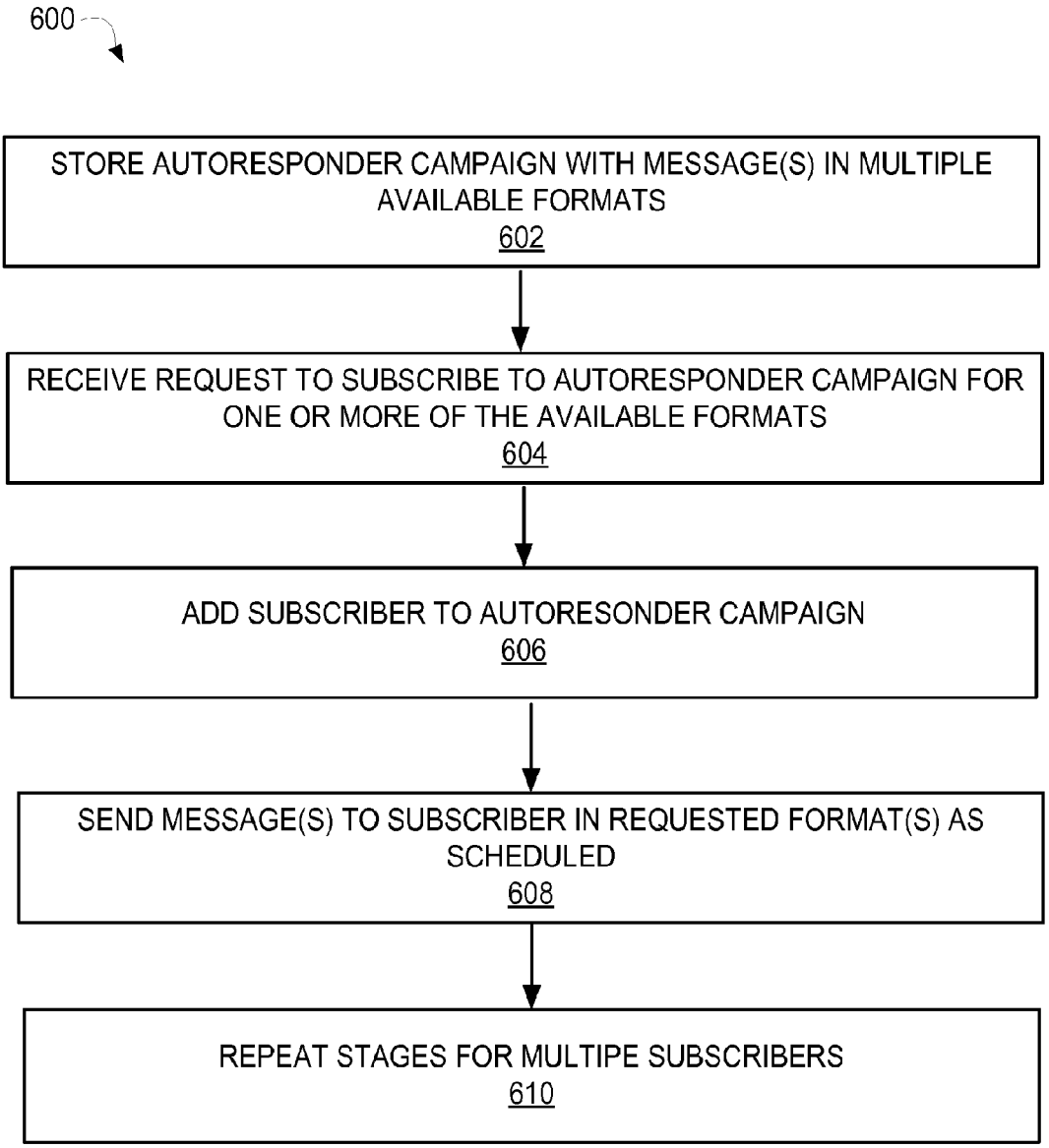
FIG. 21 is a process flow diagram for one implementation that illustrates the stages involved in providing an autoresponder series with messages capable of being delivered in a variety of available formats.

FIG. 21 is a process flow diagram 600 that illustrates one implementation of the stages involved in providing an autoresponder series with messages capable of being delivered in a variety of available formats. An autoresponder campaign is stored with one or more follow-up messages that are available to users in multiple formats (stage 602). At a later point in time, a request is received to subscribe to an autoresponder campaign of one or more messages (stage 604). The request is received from a device that has been operated by a subscriber, such as a telephone or computer of the subscriber. The request specifies one or more formats in which the subscriber wishes to be notified, from those that may be available for the campaign, such as voice broadcast, email, SMS text message, voice broadcast by email, fax, to name a few non-limiting examples. The subscriber is added to the autoresponder series (stage 606). The one or more messages are sent to the subscriber in the one or more specified formats as scheduled for the campaign (stage 608). As one non-limiting example, when the subscriber has subscribed to the campaign for the voice broadcast, the one or more messages are sent in a voice broadcast to a phone number that was previously specified by the subscriber. As another example, when the subscriber has subscribed to the autoresponder series for the voice broadcast by email, the one or more messages are sent as an audio file that is attached to an email being sent to an email address that was previously specified by the subscriber.

The subscriber can also choose to receive the messages in multiple formats if desired, such as voice broadcast and email, or voice broadcast and email with broadcast, or SMS text message and email, etc. When the subscriber has requested to receive the message in multiple formats, different formats of the message are retrieved for the campaign, and then sent in the formats requested by the subscriber. Numerous other variations and/or formats could also be used in other implementations instead of or in addition to these examples. The stages of sending messages to a subscriber in one or more of the available formats can be repeated for multiple subscribers (stage 610).

Figure 22:
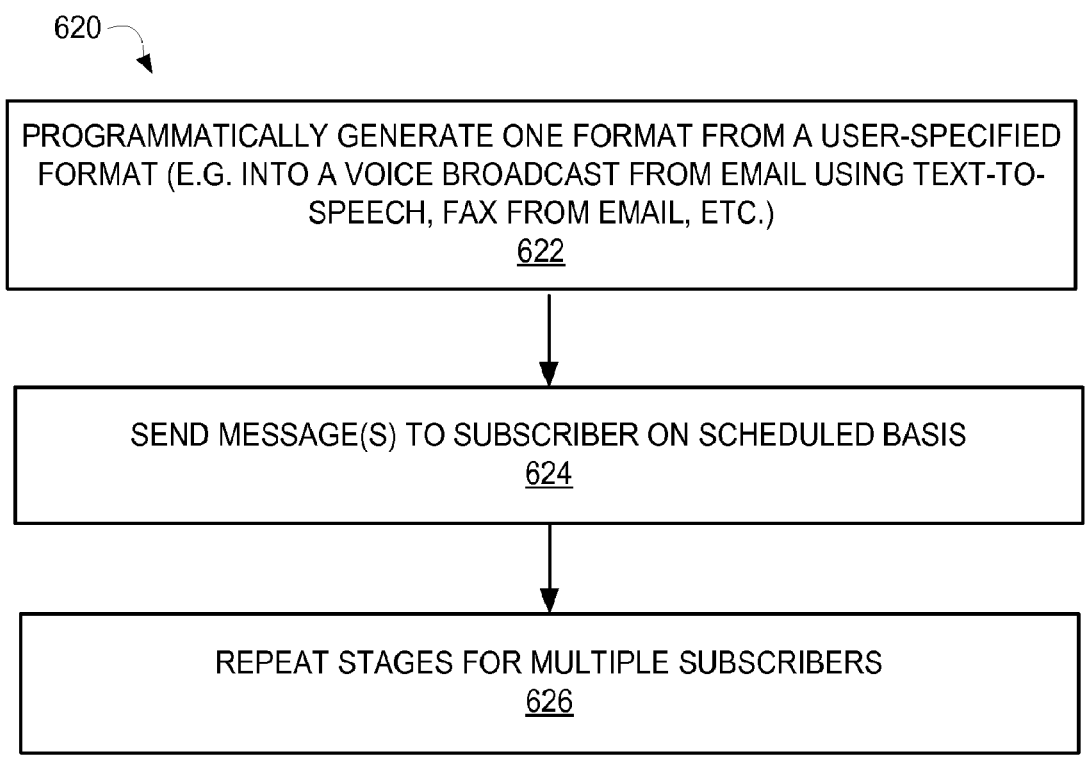
FIG. 22 is a process flow diagram for one implementation that illustrates the stages involved in generating another message format from a user specified message format.

FIG. 22 is a process flow diagram 620 that illustrates one implementation of the stages involved in generating another message format from a user-specified message format. One of the message formats that can be made available to subscribers is programmatically generated from another format that was specified by the user of the autoresponder system (stage 622), such as a campaign administrator. For example, a voice broadcast can programmatically be generated from an email/text format using text-to-speech technology. In other words, the text from the email message gets translated into an audio version that is played/spoken to the subscriber. By converting the text into an audio version that is played or otherwise spoken to the subscriber, the subscriber can "listen to" the message by voice broadcast instead of or in addition to reading the message by email.

As another non-limiting example, a fax can programmatically be generated from an email/text format by generating an image that contains some of the text and/or other formatting as desired.

In one implementation, the programmatically generated format gets generated one time and then saved as part of the available message formats until another change is made that would impact that programmatically generated format. In another implementation, the programmatically generated format is just generated at the moment a message needs to be sent to a particular subscriber.

The messages are then sent to the subscriber in the requested formats on a scheduled basis, as scheduled for the campaign (stage 624). Some or all of these stages can be repeated for multiple subscribers, as appropriate (stage 626).

Figure 23:
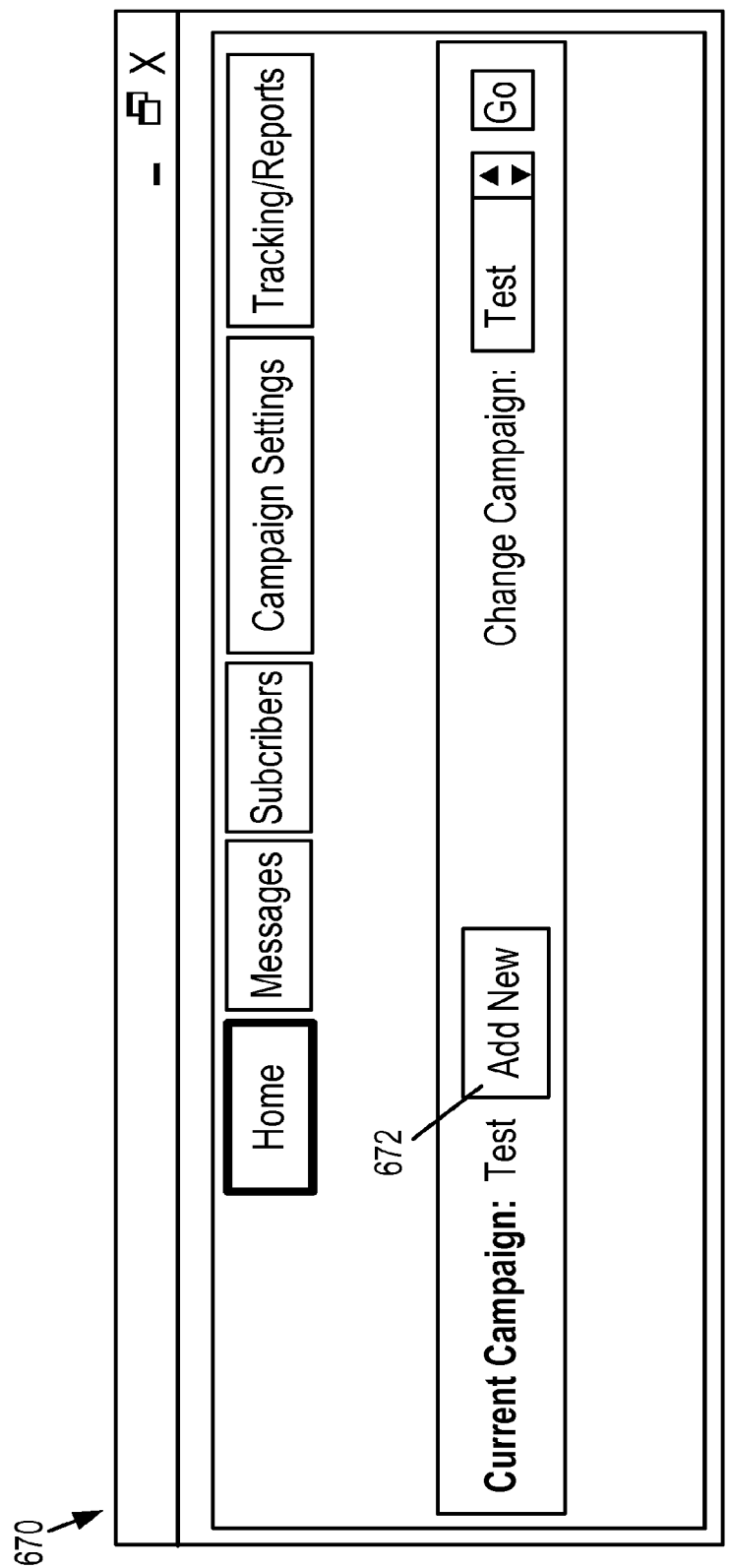
FIG. 23 is a simulated screen for one implementation that illustrates adding a new campaign to an autoresponder system.

Turning now to FIGS. 23-27, some simulated screens will be used to illustrate the integration of voice broadcasting techniques into an autoresponder that supports multiple message formats. FIG. 23 is a simulated screen 670 for one implementation that illustrates adding a new campaign to an autoresponder system. Upon selecting add new option 672, a new campaign can be created.

Figure 24:
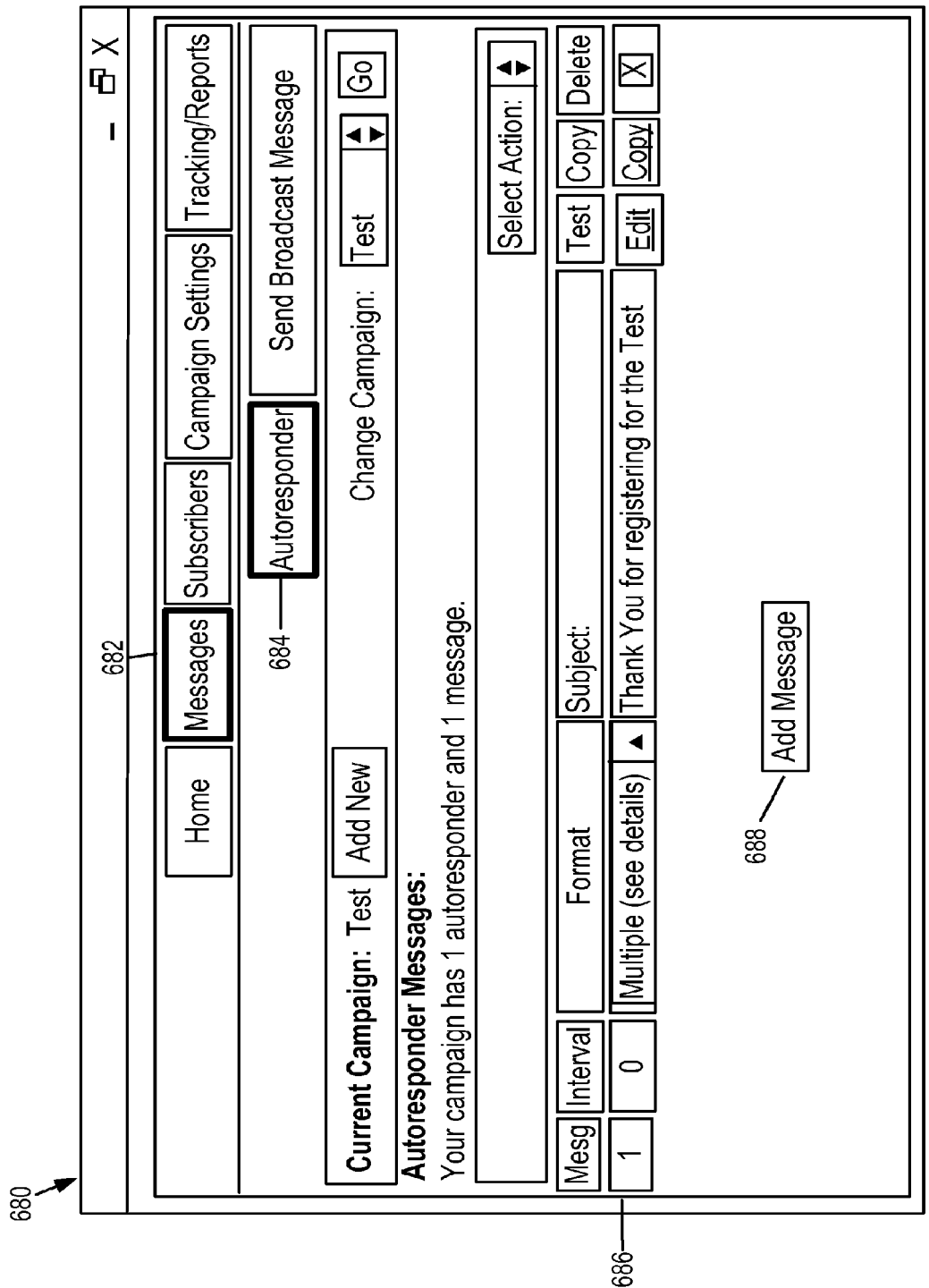
FIG. 24 is a simulated screen for one implementation that illustrates managing messages in an autoresponder series.

FIG. 24 is a simulated screen 680 for one implementation that illustrates managing messages in an autoresponder series. In the example shown, details about messages 682 for a particular autoresponder 684 are shown. In this example, there is one message 686 currently assigned to the autoresponder series. The message can be sent to the subscribers in one or more formats, such as voice broadcast, SMS text message, email, voice broadcast by email, and fax, depending on what has been specified for the message criteria (shown in further detail in FIG. 25). The user can specify the additional details regarding the message for that particular format. A user can add a new message to the autoresponder series by selecting the add message option 688.

Figure 25:
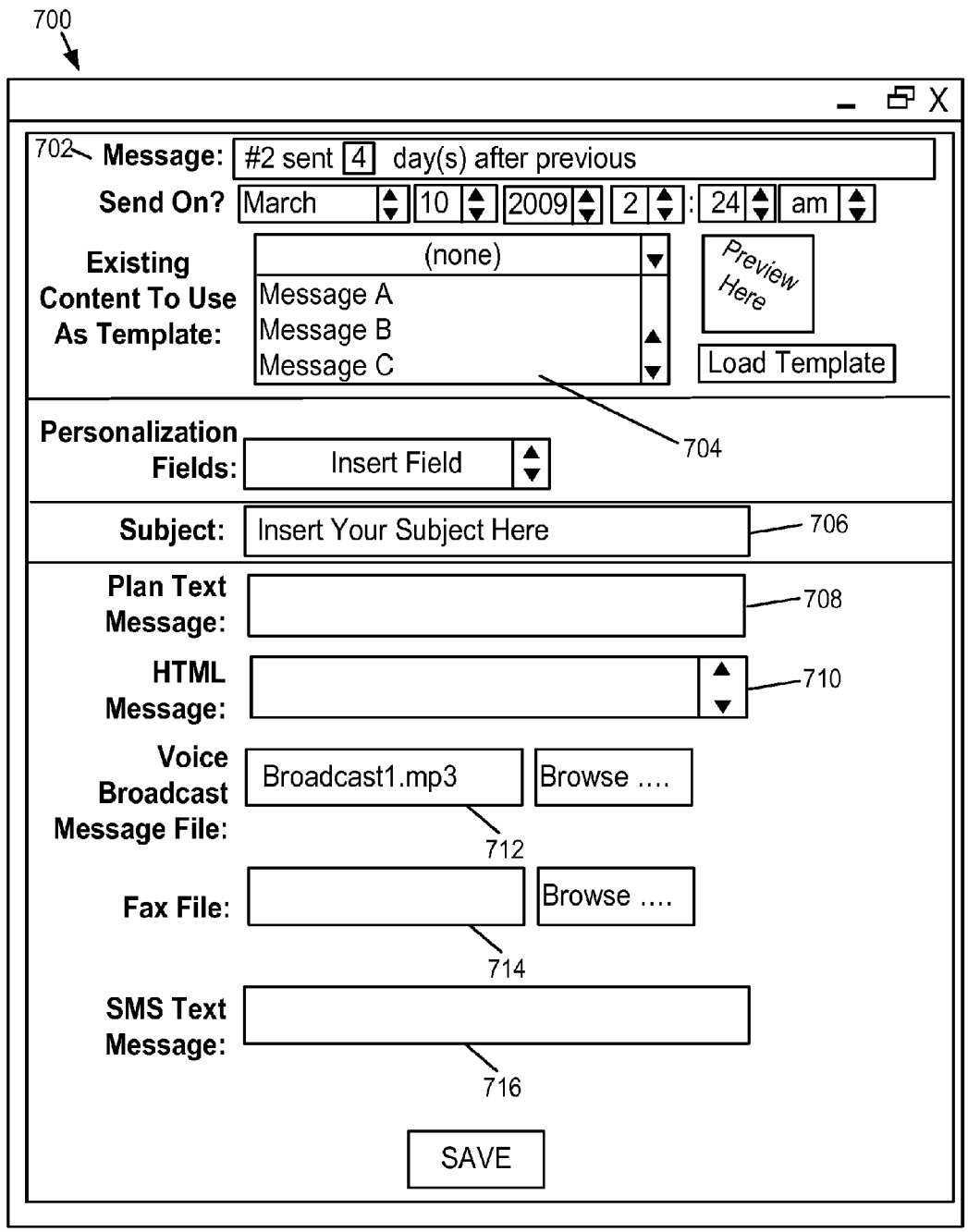
FIG. 25 is a simulated screen for one implementation that illustrates editing a selected message and/or creating a new message for an autoresponder series.

FIG. 25 is a simulated screen 700 for one implementation that illustrates editing a selected message and/or creating a new message for an autoresponder series in multiple available formats that users will be able to select from, as desired. In the example shown, various details about the message are displayed, including sequencing 702 and timing of when the message should be sent, templates to use as a starting point for the message 704, and a subject of the message 706. A plain text version of the message 708 and/or an HTML version of the message can be specified 710. Alternatively or additionally, an audio file 712 can be attached to an email and sent as a voice broadcast with subject 706 or another subject. In one implementation, audio file 712 can be used for voice broadcast by email. Other formats, such as a fax file 714 to be used for faxing can be specified, and/or an SMS text message 716 can alternatively or additionally be specified. These are just a few examples for the sake of illustration, and additional or fewer formats could also be used in other implementations.

FIG. 26 is a simulated screen 730 for one implementation that illustrates managing subscribers 732 associated with a particular campaign. In the example shown, details about some of the existing subscribers 736 to the selected campaign are shown. One or more actions 734 can be taken against the subscriber list, such as to edit the details, search the subscriber list for particular criteria, add a new subscriber, or import subscribers. The formats (contact methods 738) that the subscribers have requested to have messages sent to them in are also indicated. For example, subscriber Jane Doe has requested to receive the messages in this autoresponder series by voice broadcast 740 and voice broadcast by email 742. John Doe, on the other hand, has requested to receive the messages for this autoresponder series in an email format 744.

Figure 27:
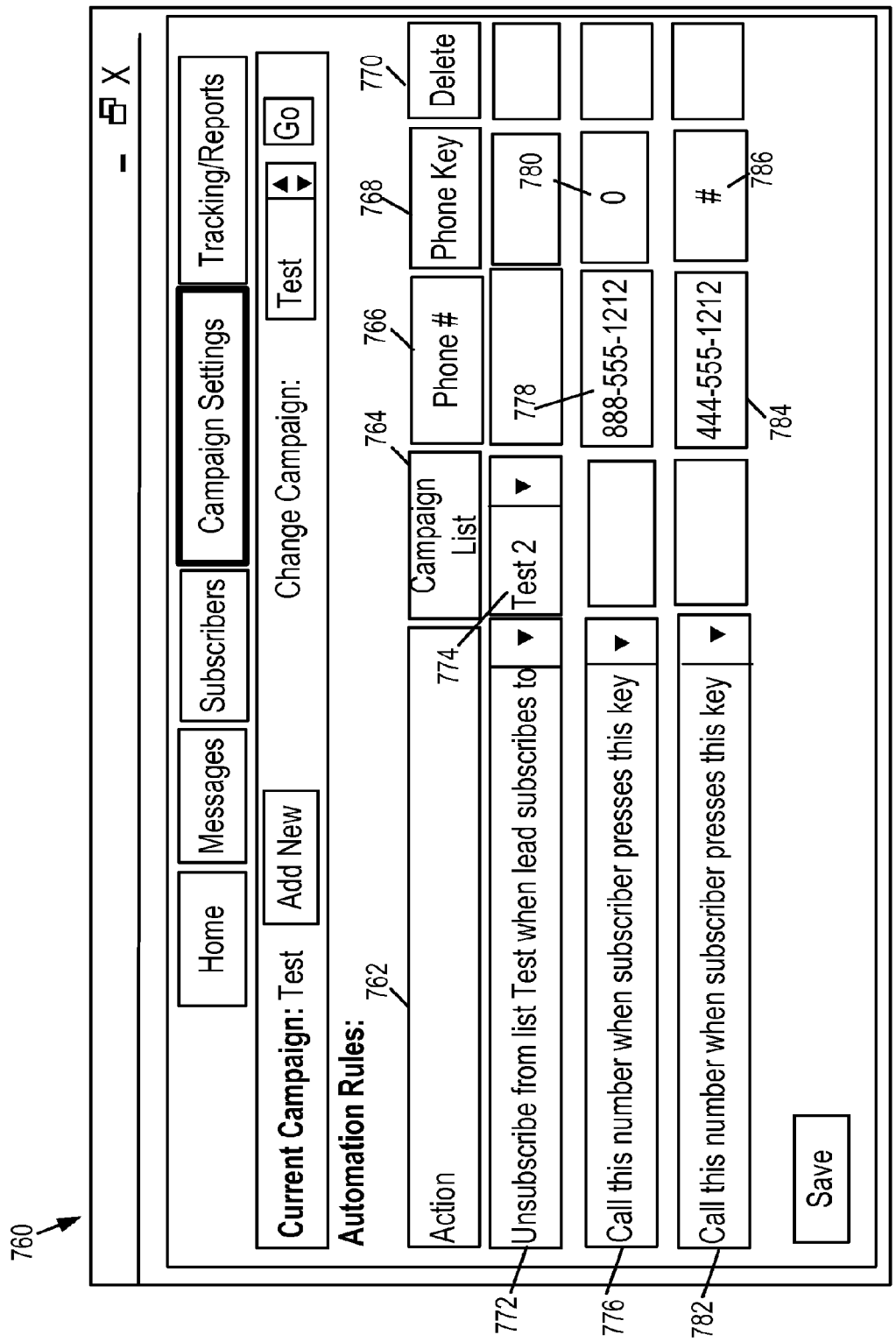
FIG. 27 is a simulated screen for one implementation that illustrates managing automation rules that are associated with a particular campaign.

FIG. 27 is a simulated screen 760 for one implementation that illustrates managing automation rules that are associated with a particular campaign, such as the action 762, campaign list 764, phone number 766, phone key 768, and delete option 770. Some or all of these fields may be filled out or left blank depending on the action 762 that is being specified. In this example, these are three automation rules assigned to the current campaign. For example, there is an unsubscribe action 772 to unsubscribe the subscriber from the current list when the subscriber subscribes to campaign list 774. As another example, there is a call this number action 776 that indicates the phone number 778 that should be called when the user presses phone key 780 (which is the 0 key in this example). As yet another example, there is another call this number action 782 that indicates the phone number 784 that should be called when the user presses phone key 786 (which is the # key in this example). These latter two automation rules can be used, for example, to specify phone numbers used with voice broadcast messages for allowing the subscriber to speak to a live operator, unsubscribe from the list, etc. Numerous other types of automation rules can be used in other implementations. These are just used for the sake of illustration.

Figure 28:
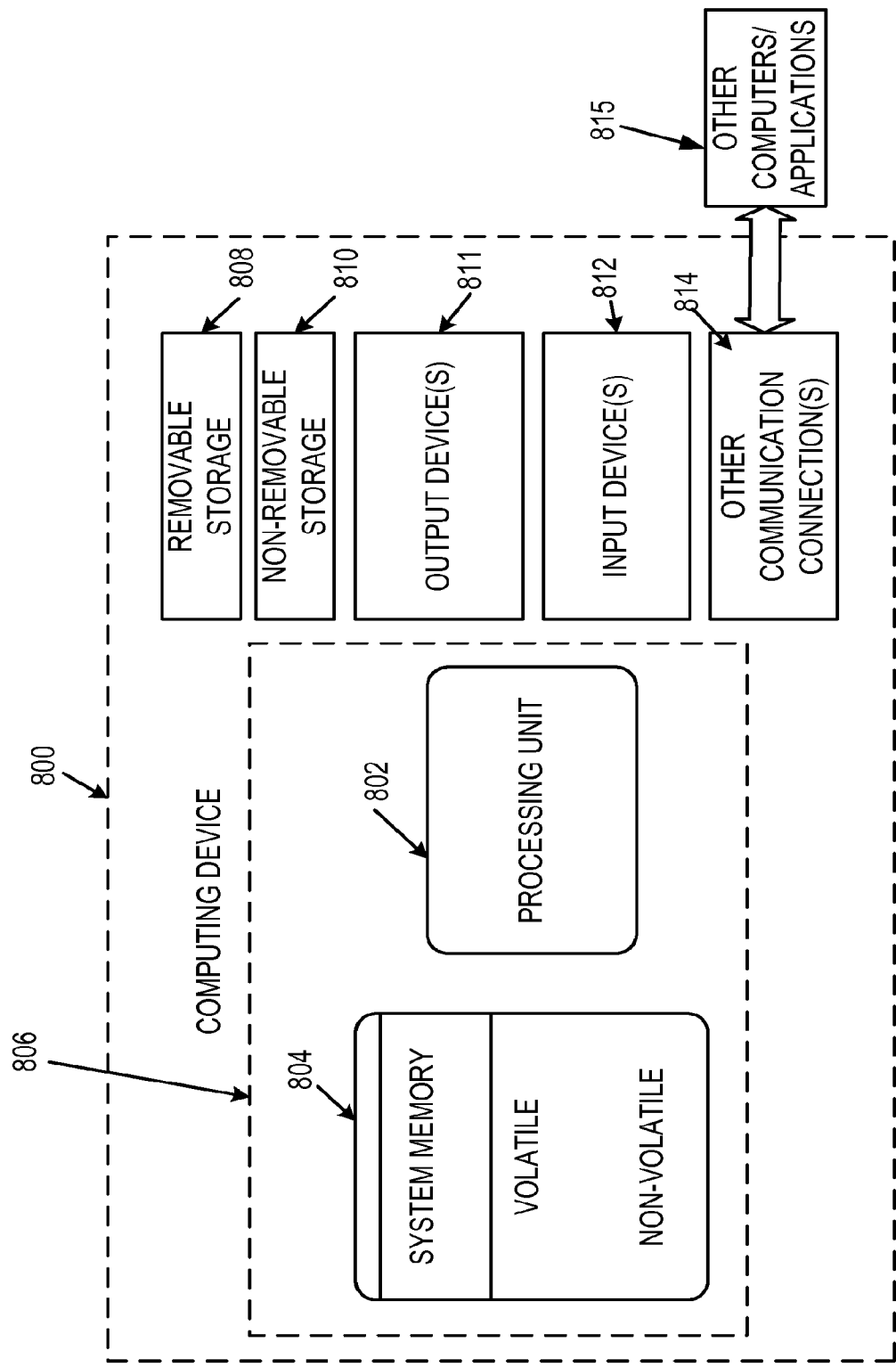
FIG. 28 is a diagrammatic view of a computer system of one implementation.

As shown in FIG. 28, an exemplary computer system to use for implementing one or more parts of the system includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 28 by dashed line 806.

Additionally, device 800 may also have additional features/functionality. For example, device 800 may also include additional storage (removable and/or non-removable) including, but not limited to, magnetic or optical disks or tape. Such additional storage is illustrated in FIG. 28 by removable storage 808 and non-removable storage 810. Computer storage media includes volatile and non-volatile, removable and non-removable media implemented in any method or technology for storage of information, such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and which can be accessed by device 800. Any such computer storage media may be part of device 800.

Computing device 800 includes one or more communication connections 814 that allow computing device 800 to communicate with other computers/applications 815. Device 800 may also have input device(s) 812 such as keyboard, mouse, pen, voice input device, touch input device, etc. Output device(s) 811 such as a display, speakers, printer, etc. may also be included. These devices are well known in the art and need not be discussed at length here. In one implementation, computing device 800 includes one or more portions of autoresponder system 10 and/or virtual seminar playback system 500.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A non-transitory, tangible computer-readable medium having computer-executable instructions for causing a computer to perform steps comprising:
   receiving a voice input from a subscriber; converting the voice input to text;
   adding the subscriber to at least one campaign;

storing, in a subscriber contact record, at least one contact communication identifier that was obtained from the text that was converted from the voice input; and sending at least one message to the subscriber in at least one message format to the at least one contact communication identifier according a schedule specified in the at least one campaign the computer-executable instructions further causing the computer to perform steps comprising:

detecting when the voice input is being received from the subscriber over a mobile telephone;

storing a phone number associated with the mobile telephone in the subscriber contact record as another contact communication identifier for the subscriber;

sending the subscriber an SMS text message with a follow-up question;

receiving a response to the follow-up question from the subscriber;

storing the response to the follow-up question in at least one data field in the subscriber contact record, the at least one data field being associated with the follow-up question;

locating supplemental information about the subscriber in an external database using data contained in the response to the follow-up question; and storing the supplemental information about the subscriber in the subscriber contact record.

2. The computer-readable medium of claim 1, wherein the receiving the voice input step is operable to save the voice input to an audio file upon receiving the voice input from the subscriber; and wherein the converting the voice input step is operable to extract the text from the audio file through an automated speech-to-text translation process.

3. The computer-readable medium of claim 1, wherein the converting the voice input step is operable to be performed interactively as the voice input is received from the subscriber, and wherein the converting the voice input step is further operable to request a confirmation selection from the subscriber to have the subscriber confirm that an accurate translation has been made of the voice input.

4. The computer-readable medium of claim 1, further having computer-executable instructions for causing a computer to perform steps comprising:

performing a validation test to determine if the at least one contact communication identifier is valid; and when the validation test fails, sending an error message to a user to provide the user with an opportunity to correct the at least one contact communication identifier for the subscriber.

5. The computer-readable medium of claim 1, further having computer-executable instructions for causing a computer to perform steps comprising:

when the response to the follow-up question contains a web site associated with the subscriber, executing a data scraping process to capture data from the web site; and storing at least a portion of the data from the web site in the subscriber contact record.

6. The computer-readable medium of claim 1, wherein the voice input is received from the subscriber over a specified telephone number, the specified telephone number having been allocated interactively by a user for use with the at least one campaign to allow details about the at least one campaign to be tracked.

* * * * *